(12) United States Patent
Fang et al.

(10) Patent No.: US 11,823,059 B2
(45) Date of Patent: Nov. 21, 2023

(54) GENERATING A PERSONALIZED PREFERENCE RANKING NETWORK FOR PROVIDING VISUALLY-AWARE ITEM RECOMMENDATIONS

(71) Applicants: Adobe Inc., San Jose, CA (US); The Regents of the University of California, Oakland, CA (US)

(72) Inventors: Chen Fang, Hanover, NH (US); Zhaowen Wang, San Jose, CA (US); Wangcheng Kang, San Diego, CA (US); Julian McAuley, San Diego, CA (US)

(73) Assignees: Adobe Inc., San Jose, CA (US); The Regents of the University of California, Oakland, CA (US)

( * ) Notice: Subject to any disclaimer, the term of this patent is extended or adjusted under 35 U.S.C. 154(b) by 209 days.

(21) Appl. No.: 17/377,043

(22) Filed: Jul. 15, 2021

(65) Prior Publication Data
US 2021/0342697 A1   Nov. 4, 2021

Related U.S. Application Data

(62) Division of application No. 15/897,822, filed on Feb. 15, 2018, now Pat. No. 11,100,400.

(51) Int. Cl.
*G06N 3/08* (2023.01)
*G06F 16/51* (2019.01)
*G06N 3/084* (2023.01)

(52) U.S. Cl.
CPC ............. *G06N 3/084* (2013.01); *G06F 16/51* (2019.01)

(58) Field of Classification Search
CPC .................................................... G06N 3/0454
See application file for complete search history.

(56) References Cited

U.S. PATENT DOCUMENTS

2019/0205965 A1   7/2019   Li et al.
2020/0320769 A1*  10/2020  Chen ..................... G06F 18/214

OTHER PUBLICATIONS

R. He and J. McAuley, "VBPR: visual bayesian personalized ranking from implicit feedback," in AAAI, 2016.
Y. Jia, E. Shelhamer, J. Donahue, S. Karayev, J. Long, R. B. Girshick, S. Guadarrama, and T. Darrell, "Caffe: Convolutional architecture for fast feature embedding," in MM, 2014.

(Continued)

*Primary Examiner* — Moazzam Hossain
(74) *Attorney, Agent, or Firm* — Keller Preece PLLC

(57) ABSTRACT

The present disclosure relates to a fashion recommendation system that employs a task-guided learning framework to jointly train a visually-aware personalized preference ranking network. In addition, the fashion recommendation system employs implicit feedback and generated user-based triplets to learn variances in the user's fashion preferences for items with which the user has not yet interacted. In particular, the fashion recommendation system uses triplets generated from implicit user data to jointly train a Siamese convolutional neural network and a personalized ranking model, which together produce a user preference predictor that determines personalized fashion recommendations for a user.

20 Claims, 11 Drawing Sheets

(56) References Cited

OTHER PUBLICATIONS

R. He and J. McAuley, "Ups and downs: Modeling the visual evolution of fashion trends with one-class collaborative filtering," in WWW, 2016.

R. He, C. Fang, Z. Wang, and J. McAuley, "Vista: A visually, socially, and temporally-aware model for artistic recommendation," in RecSys, 2016.

A. Veit, B. Kovacs, S. Bell, J. McAuley, K. Bala, and S. Belongie, "Learning visual clothing style with heterogeneous dyadic cooccurrences," in ICCV, 2015.

H. Wang, N. Wang, and D.-Y. Yeung, "Collaborative deep learning for recommender systems," in SIGKDD, 2015.

C. Lei, D. Liu, W. Li, Z.-J. Zha, and H. Li, "Comparative deep learning of hybrid representations for image recommendations," in CVPR, 2016.

S. Rendle, C. Freudenthaler, Z. Gantner, and L. Schmidt-Thieme, "BPR: bayesian personalized ranking from implicit feedback," in UAI, 2009.

I. Goodfellow, J. Pouget-Abadie, M. Mirza, B. Xu, D. Warde-Farley, S. Ozair, A. Courville, and Y. Bengio, "Generative adversarial nets," in NIPS, 2014.

R. Hadsell, S. Chopra, and Y. LeCun, "Dimensionality reduction by learning an invariant mapping," in CVPR, 2006.

A. Nguyen, A. Dosovitskiy, J. Yosinski, T. Brox, and J. Clune, "Synthesizing the preferred inputs for neurons in neural networks via deep generator networks," in NIPS, 2016.

J. McAuley, C. Targett, Q. Shi, and A. van den Hengel, "Image-based recommendations on style and substitutes," in SIGIR, 2015.

Y. Hu, Y. Koren, and C. Volinsky, "Collaborative filtering for implicit feedback datasets," in ICDM, 2008.

R. Pan, Y. Zhou, B. Cao, N. N. Liu, R. Lukose, M. Scholz, and Q. Yang, "One-class collaborative filtering," in ICDM, 2008.

J. Yang, C. Liu, M. Teng, H. Xiong, M. Liao, and V. Zhu, "Exploiting temporal and social factors for B2B marketing campaign recommendations," in ICDM, 2015.

D. Lian, Y. Ge, F. Zhang, N. J. Yuan, X. Xie, T. Zhou, and Y. Rui, "Content-aware collaborative filtering for location recommendation based on human mobility data," in ICDM, 2015.

Z. Yao, Y. Fu, B. Liu, Y. Liu, and H. Xiong, "POI recommendation: A temporal matching between POI popularity and user regularity," in ICDM, 2016.

P. Covington, J. Adams, and E. Sargin, "Deep neural networks for youtube recommendations," in RecSys, 2016.

S. Wang, Y. Wang, J. Tang, K. Shu, S. Ranganath, and H. Liu, "What your images reveal: Exploiting visual contents for point-of-interest recommendation," in WWW, 2017.

Y. Li, L. Cao, J. Zhu, and J. Luo, "Mining fashion outfit composition using an end-to-end deep learning approach on set data," TMM, 2017.

X. Han, Z. Wu, Y. Jiang, and L. S. Davis, "Learning fashion compatibility with bidirectional lstms," in MM, 2017.

Z. Al-Halah, R. Stiefelhagen, and K. Grauman, "Fashion forward: Forecasting visual style in fashion," in ICCV, 2017.

L. Bossard, M. Dantone, C. Leistner, C. Wengert, T. Quack, and L. Van Gool, "Apparel classification with style," in ACCV, 2013.

A. C. Murillo, I. S. Kwak, L. Bourdev, D. Kriegman, and S. Belongie, "Urban tribes: Analyzing group photos from a social perspective," in Computer Vision and Pattern Recognition Workshops (CVPRW), 2012.

S. Vittayakorn, K. Yamaguchi, A. C. Berg, and T. L. Berg, "Runway to realway: Visual analysis of fashion," in WACV, 2015.

A. Krizhevsky, I. Sutskever, and G. E. Hinton, "Imagenet classification with deep convolutional neural networks," in NIPS, 2012.

J. Hu, J. Lu, and Y.-P. Tan, "Discriminative deep metric learning for face verification in the wild," in CVPR, 2014.

S. Bell and K. Bala, "Learning visual similarity for product design with convolutional neural networks," in TOG, 2015.

M. Mirza and S. Osindero, "Conditional generative adversarial nets," arXiv preprint arXiv:1411.1784, 2014.

Y. Koren and R. Bell, "Advances in collaborative filtering," in Recommender Systems Handbook. Springer, 2011.

K. Chatfield, K. Simonyan, A. Vedaldi, and A. Zisserman, "Return of the devil in the details: Delving deep into convolutional nets," in BMVC, 2014.

K. He, X. Zhang, S. Ren, and J. Sun, "Deep residual learning for image recognition," in CVPR, 2016.

D. P. Kingma and J. Ba, "Adam: A method for stochastic optimization," in ICLR, 2015.

A. Radford, L. Metz, and S. Chintala, "Unsupervised representation learning with deep convolutional generative adversarial networks," arXiv preprint arXiv:1511.06434, 2015.

A. Odena, C. Olah, and J. Shlens, "Conditional image synthesis with auxiliary classifier gans," in ICML, 2017.

S. Reed, Z. Akata, X. Yan, L. Logeswaran, B. Schiele, and H. Lee, "Generative adversarial text to image synthesis," in ICML, 2016.

X. Mao, Q. Li, H. Xie, R. Y. Lau, Z. Wang, and S. P. Smolley, "Least squares generative adversarial networks," arXiv preprint ArXiv:1611.04076, 2016.

T. Salimans, I. J. Goodfellow, W. Zaremba, V. Cheung, A. Radford, and X. Chen, "Improved techniques for training gans," in NIPS, 2016.

Z. Wang, A. C. Bovik, H. R. Sheikh, and E. P. Simoncelli, "Image quality assessment: from error visibility to structural similarity," TIP, 2004.

J. Weston, S. Bengio, and N. Usunier, "Wsabie: Scaling up to large vocabulary image annotation," in IJCAI, 2011.

S. Rendle, "Factorization machines," in ICDM, 2010.

M. Kula, "Metadata embeddings for user and item cold-start recommendations," arXiv preprint arXiv:1507.08439, 2015.

U.S. Appl. No. 15/897,822, Feb. 9, 2021, Office Action.

U.S. Appl. No. 15/897,822, May 19, 2021, Notice of Allowance.

\* cited by examiner

| Dataset | Setting | (a) RAND | (b) PopRank | (c) WARP | (d) BPR-MF | (e) VisRank | (f) FM | (g) VBPR | (h) DVBPR | Improvement h vs. d | h vs. best |
|---|---|---|---|---|---|---|---|---|---|---|---|
| Fashion | All Items | 0.5 | 0.5849 | 0.6065 | 0.6278 | 0.6839 | 0.7003 | 0.7479 | 0.7964 | 26.9% | 6.5% |
| | Cold Items | 0.5 | 0.3905 | 0.5030 | 0.5514 | 0.6807 | 0.7088 | 0.7319 | 0.7718 | 40.0% | 5.5% |
| Women | All Items | 0.5 | 0.6192 | 0.5998 | 0.6543 | 0.6512 | 0.6678 | 0.7081 | 0.7574 | 15.8% | 7.0% |
| | Cold Items | 0.5 | 0.3822 | 0.5017 | 0.5196 | 0.6387 | 0.6682 | 0.6885 | 0.7137 | 37.4% | 3.7% |
| Men | All Items | 0.5 | 0.6060 | 0.6081 | 0.6450 | 0.6589 | 0.6654 | 0.7089 | 0.7410 | 14.9% | 4.5% |
| | Cold Items | 0.5 | 0.3903 | 0.5005 | 0.5132 | 0.6545 | 0.6705 | 0.6863 | 0.6923 | 34.9% | 0.9% |
| ccm | All Items | 0.5 | 0.5268 | 0.6176 | 0.5860 | 0.6457 | 0.7662 | 0.7500 | 0.7857 | 34.1% | 2.5% |
| | Cold Items | 0.5 | 0.3946 | 0.5333 | 0.5418 | 0.6084 | 0.7730 | 0.7525 | 0.7793 | 43.8% | 0.8% |

*Fig. 7*

GENERATING A PERSONALIZED PREFERENCE RANKING NETWORK FOR PROVIDING VISUALLY-AWARE ITEM RECOMMENDATIONS

CROSS-REFERENCE TO RELATED APPLICATIONS

The present application is a divisional of U.S. application Ser. No. 15/897,822, filed on Feb. 15, 2018. The aforementioned application is hereby incorporated by reference in its entirety.

BACKGROUND

Recent years have seen a rapid increase in the use of computing devices in the area of fashion. Indeed, it is now commonplace for individuals and businesses to use computing devices to design, share, make, sell, and manage fashion items such as articles of clothing and accessories. Moreover, modern computing devices have enabled a near-limitless selection of fashion items to users desiring to buy, view, or follow these fashion items.

With the increase in the availability of fashion items comes the challenge of identifying and providing users with personalized recommendations. For at least the reasons provided below, conventional recommendation systems struggle in the area and domain of personalized fashion recommendation. As one example, conventional systems rely on semantics rather than visual signals to determine what is 'fashionable.' However, like fashion items themselves, fashion semantics are very complex and varied. For example, in some cases, the same semantics describe different fashion features. In other cases, different semantics describe the same fashion feature.

Compounding the issue of semantic complexity, as another challenge, conventional systems struggle with the cold start problem. A cold start refers to new items being introduced. For instance, conventional systems are unsure how to process newly introduced fashion items or rare/unique fashion items. Indeed, some fashion items have a large availability (e.g., a large sample size), while other items are part of a limited edition and/or are quite diverse in their nature and style. Conventional systems often cannot or do not begin to process or organize unique or new items until sufficient data has been gathered regarding the use and nature of the fashion item. Because new and unique items are continually being introduced, many conventional systems cannot effectively process and recommend these items.

As another example, conventional systems struggle with fashion recommendations because fashion trends are constantly changing. Not only do fashion trends change relatively quickly, but a user's personal style preferences also change. The constant shift in trends, styles, and preferences introduces further difficulties and issues into conventional systems attempting to provide users with personalized fashion recommendations.

Because semantic data with fashion items can be sparse and unreliable, some conventional systems have attempted to provide users with fashion recommendations based on preferences of similar users. For example, these conventional systems group a user with co-users and provides common fashion item recommendations based on shared characteristics of the group rather than the user's personal preference. In addition, these conventional systems use pre-extracted features that are geared toward fashion item classification rather than fashion item recommendation.

Overall, conventional systems often waste computing resources by inefficiently attempting to gather and analyze data in an attempt to provide users with personalized recommendations. However, due to the complexity of the fashion domain, the inflexibility of these systems prevents them from efficiently analyzing and providing accurate personalized fashion recommendation results to users.

These and other problems exist with regard to identifying, analyzing, and providing personalized fashion item recommendations to users using existing systems and methods.

SUMMARY

Embodiments of the present disclosure provide benefits and/or solve one or more of the foregoing or other problems in the art with systems, computer media, and methods for effectively providing personalized fashion recommendations to users using deep learning visually-aware techniques trained using implicit user feedback. For example, the disclosed systems train a visually-aware personalized preference ranking network using implicit user feedback to efficiently determine personalized fashion recommendations for a user. By employing implicit feedback and visually-aware data, the disclosed systems can more accurately discover a user's current fashion preferences and match the user with user-preferred fashion items with which the user has not yet interacted.

The disclosed systems use the implicit user feedback to jointly train a Siamese convolutional neural network to determine latent item features as well as a personalized ranking model to determine latent user features. Further, using back propagation and end-to-end learning, the disclosed systems continues to train the Siamese convolutional neural network and personalized ranking model until the correlation between the latent item features and the latent user features are maximized and/or a convergence occurs.

Once trained, the disclosed systems employ the visually-aware personalized preference ranking network to provide personalized fashion recommendations to a user. In particular, the disclosed systems feed a dataset of fashion item images through one of the neural networks of the trained Siamese convolutional neural network to obtain the latent item features for each item. The disclosed systems then correlate the latent item features with the trained latent user features of the personalized ranking model to identify a preference prediction score for each of the items. Based on the preference prediction scores, the disclosed systems provide one or more recommended fashion items from the dataset to a client device associated with the user.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 7 illustrates a table of comparisons between conventional fashion recommendation systems and one or more embodiments of the fashion recommendation system disclosed herein.

DETAILED DESCRIPTION

Figure 1:
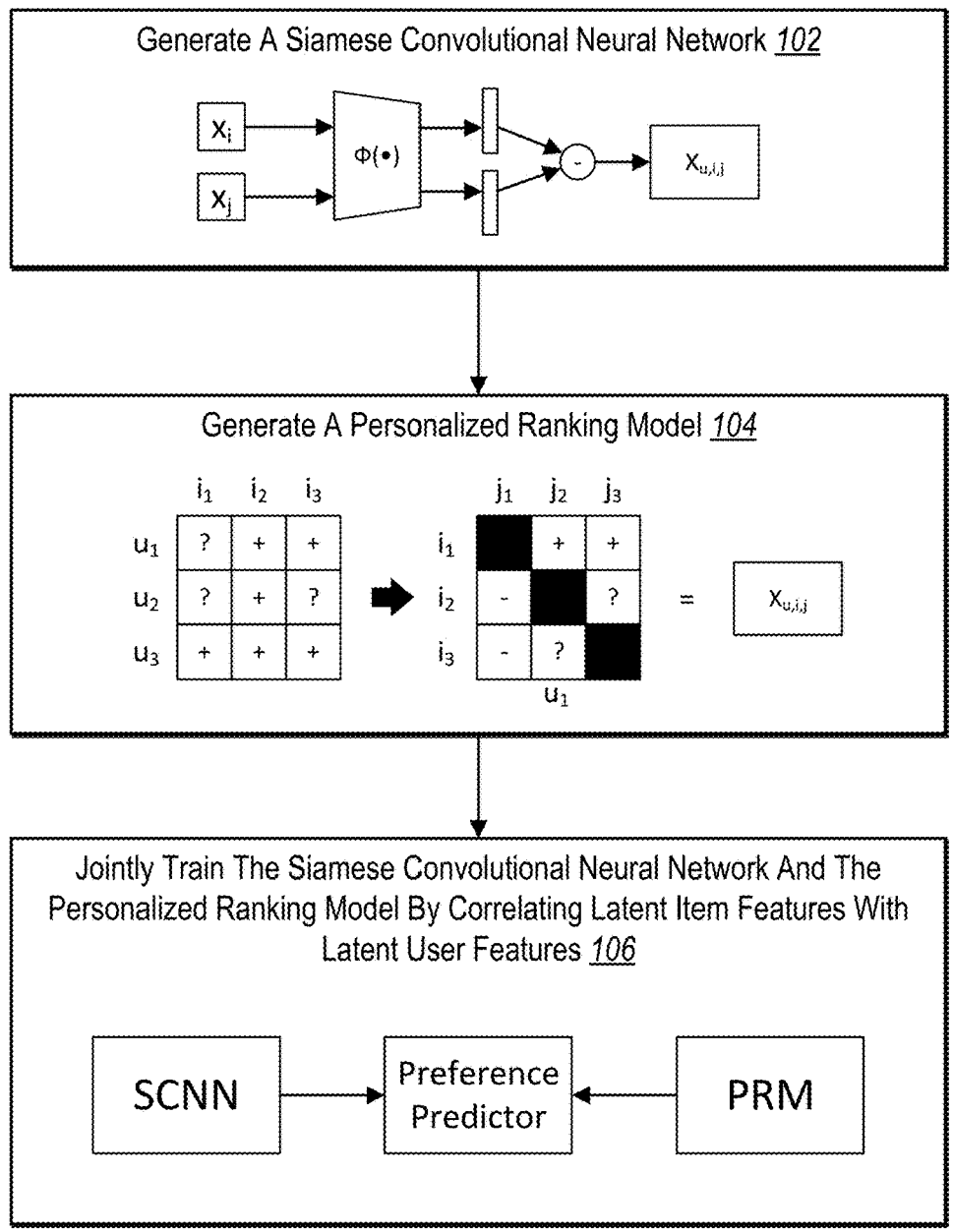
FIG. 1 illustrates a diagram of a general process for training a visually-aware personalized preference ranking network in accordance with one or more embodiments.

This disclosure describes one or more embodiments of a fashion recommendation system that employs implicit user data and corresponding images of fashion items to train a visually-aware personalized preference ranking network that provides personalized fashion recommendations. In particular, the fashion recommendation system uses implicit user data to jointly train a convolutional neural network and a personalized ranking model, which together produce a user preference predictor that determines personalized fashion recommendations for a user. More specifically, the fashion recommendation system uses deep learning to learn from image content (at the pixel level) to build a recommender system.

To illustrate, in various embodiments, the fashion recommendation system obtains a dataset of fashion items (e.g., a training dataset). Included with the dataset is implicit user data for one or more users corresponding to various items within the dataset (e.g., a subset of items). For example, the subset of items corresponds to items for which a user has viewed, selected, shared, added to a digital cart, purchased, or performed another action not expressly intended to be shared with other users. Using the fashion item dataset, the fashion recommendation system generates a set of triplets that include a user, an item in the subset associated with implicit feedback from the user (e.g., a positive item), and an item that does not have feedback is (e.g., a negative item). Indeed, each triplet includes an item with which the user has interacted with that is ranked above another item for which no user interaction data is available.

In addition to generating triplets for one or more users, the fashion recommendation system can train a visually-aware personalized preference ranking network for each user using the triplets to provide personalized fashion recommendations to the user. For instance, in one or more embodiments, the fashion recommendation system generates a Siamese convolutional neural network to determine latent item features for the user using the user's triplets. In particular, the fashion recommendation system generates two parallel convolutional neural networks (e.g., positive and negative networks) that share tunable parameters and weights. In addition, the fashion recommendation system generates a personalized ranking model that determines latent user features for the user. Using the triplets, task-guided end-to-end learning, and back propagation, the fashion recommendation system can jointly train both the Siamese convolutional neural network and the personalized ranking model to maximize correlations between the item latent features and the user latent features, which results in creating an efficient preference predictor personalized to the user.

To illustrate, using the preference predictor of the trained visually-aware personalized preference ranking network, the fashion recommendation system can provide personalized fashion recommendations to the user. For instance, in some embodiments, the fashion recommendation system feeds images from a dataset of fashion items through one of the neural networks of the trained Siamese convolutional neural network to extract visual latent item features for each item. The fashion recommendation system then correlates the latent item features of each item with the trained latent user features to identify preference prediction scores for each of the items. Based on the preference prediction scores, the fashion recommendation system ranks the items in the dataset and provides one or more recommended fashion items to a client device associated with the user.

As mentioned, the fashion recommendation system employs a Siamese convolutional neural network to determine latent item features, which includes a positive item convolutional neural network and negative item convolutional neural network having corresponding layers, and which shares tunable weights and parameters between the two networks. In various embodiments, the fashion recommendation system feeds a triplet for a user into the Siamese convolutional neural network—the positive image into the positive network and the negative image into the negative network. Each network extracts visual features of the corresponding images and outputs a latent item feature corresponding to the inputted image.

In additional embodiments, the fashion recommendation system compares the positive outputs of the positive network to the negative output of the negative network to identify visual latent item features preferred by the user. For example, in some embodiments, the fashion recommendation system subtracts, in feature vector space, the negative network output from the positive network output to identify latent item features that are preferred by the user. In alternative embodiments, the fashion recommendation system employs other methods to compare the respective outputs.

As also mentioned above, the fashion recommendation system employs a personalized ranking model to determine latent user features for a user based on triplet training. In some embodiments, the fashion recommendation system uses a Bayesian personalization ranking loss algorithm as the personalized ranking model. In additional embodiments, the fashion recommendation system also employs matrix factorization and/or stochastic gradient to determine latent user features.

As further mentioned above, the fashion recommendation system uses datasets to generate triplets, train the visually-aware personalized preference ranking network, and select images of fashion items to recommend to the user. In some embodiments, the datasets include one or more overlapping items. In alternative embodiments, the datasets are mutually exclusive.

As previously mentioned, the fashion recommendation system provides many advantages and benefits over conventional systems and methods. As recently mentioned, the fashion recommendation system can employ mutually exclusive datasets. In particular, the fashion recommendation system can train with an image item dataset from one domain and provide recommendations from an image item dataset from a second domain. For example, the training image item dataset includes shoes while the recommendation image item dataset includes other fashion accessories. Indeed, because the fashion recommendation system employs visually-aware images in training, the fashion recommendation system provides increased flexibility over conventional systems by determining personalized recommendations across domains and subdomains.

As an additional benefit, the fashion recommendation system can train and provide personalized recommendations when little or no semantic information is provided in connection with items. As detailed previously, conventional systems rely heavily on semantic data to classify and organize fashion items. Because of the complexity, diversity, and non-uniformity of semantic information, conventional systems struggle to provide personalized recommendations, particularly with respect to new or unique/rare fashion items (e.g., cold starts). In contrast, the fashion recommendation system employs visual-based information (e.g., images of items) in connection with hidden and implicit data to discover fashion properties and preferences of fashion items for individual users.

Further, as another example, because visual-based training datasets are used in training, the fashion recommendation system can employ smaller training datasets because each item in an image dataset includes a sufficient training information. In contrast, conventional systems that rely on semantic data must filter out items in the dataset that do not include a sufficient amount of information to train a network or model, which often filters out many new, limited, or rare fashion items. Thus, the fashion recommendation system can achieve better personalization recommendation results with less computational requirements than conventional systems.

As further described below, the fashion recommendation system also outperforms conventional systems in head-to-head evaluations with respect to personalized recommendation performance. For instance, the fashion recommendation system outperformed conventional systems with respect to various training and retrieval datasets. Additional results are described below with respect to FIG. 7.

Additional advantages and benefits of the fashion recommendation system will become apparent in view of the following description. In particular, one or more embodiments of the fashion recommendation system will be described below with reference to one or more figures. Further, the following definitions of terms will be used to describe one or more features of the fashion recommendation system.

As used herein, the term "item" refers generally to a compilation of digital data that can be stored on a computing device. In particular, the term "item" refers to a compilation of digital data stored in one or more file types or formats. In general, an item refers to a fashion item, such as clothing, articles, or accessories in the fashion domain. However, an item can correspond to items in alternative domains. In addition, items can be stored in datasets or databases of items, as described below. In some embodiments, an item also includes data or metadata describing or categorizing an item (e.g., women's shoes, red shirt, or hat).

As used herein, the term "image" refers to any type of digital graphics file that includes an object and/or element. In particular, the term "image" refers to a digital file that visually depicts an item. Images are often associated with items, such as fashion items. For instance, each item in a dataset includes at least one image of the item in the dataset. In these instances, the term "image item" refers to an item that is represented by an image of the item.

The term "triplet," as used herein refers to a given user's relationship to a set of items (e.g., fashion items). A triplet includes a user, a positive item, and a negative item. In particular, the term "triplet" refers to a user preferring the positive item in the triplet at least the same amount or a greater amount than the negative item in the triplet. Indeed, the positive item is largely ranked or scored higher (but not below) than the negative item in a triplet. In many embodiments, the positive item is associated with items for which the user has provided feedback (e.g., implicit or explicit), while the negative has no such associated information. As described below, the fashion recommendation system generates and employs triplets to train a visually-aware personalized preference ranking network including a Siamese convolutional neural network and a personalized ranking model.

The term "machine learning," as used herein, refers to the process of constructing and implementing algorithms that can learn from and make predictions on data. In general, machine learning may operate by building models from example inputs (e.g., training), such as triplets, to make data-driven predictions or decisions. In some example embodiments, machine learning is used for data mining, and statistical pattern recognition, such as collaborative feature learning, or learning features from a training image-based item set. Machine learning can include neural networks (e.g., a Siamese convolutional neural network), data-based models (e.g., a personalized ranking model), or a combination of networks and models (e.g., a visually-aware personalized preference ranking network).

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data. In one or more embodiments, a neural network refers to a neural network having a regression loss model in the loss layer.

In addition, the term "Siamese convolutional neural network" refers to a matching or parallel set of convolutional neural networks with one or more shared parameters. In particular, the term "Siamese convolutional neural network" refers to two convolutional neural networks that share tunable weights and parameters. For instance, a Siamese convolutional neural network includes a positive convolutional neural network and a matching negative convolutional neural network, both networks equally processing their respective inputs (e.g., a positive image item and a negative image item). Further, in some embodiments, the Siamese convolutional neural network share the same cost model that compares the output of the networks (e.g., measures scaler loss based on the distance between a positive output and negative output in vector space) to determine desired latent features.

The term "personalized ranking model" refers to a machine-learning algorithm that is trained to analyze data and produce a resulting latent representation or embedding. In some embodiments, a personalized ranking model includes a Bayesian personalization ranking algorithm that employs a loss method to determine latent feature vectors as the personalized ranking model. In additional embodiments, the fashion recommendation system also employs matrix factorization as an underlying predictor and/or stochastic gradient (e.g., ascent or descent) to determine feature vectors. Generally, the personalized ranking model determines latent user features, as described below.

As used herein, the term "loss function" or "loss model" refers to a function that indicates loss errors. As just mentioned, in some embodiments, a machine-learning algorithm can repetitively train to minimize the total overall loss. In some embodiments, the fashion recommendation system employs multiple loss functions and minimizes the total loss between multiple networks and models. An example of a loss function includes softmax classifier with cross-entropy loss. Another example of a loss function includes a hinge loss function that is used to train classifiers based on triplets and a fine parameter margin.

As used herein, the term "joint learning" refers to a machine-learning algorithm where multiple learning models are learned together. In particular, the term "joint learning" includes solving a plurality of learning tasks at the same time while utilizing the roles and constraints across the tasks. For example, the fashion recommendation system can employ joint learning to simultaneously train and tune the parameters of both the Siamese convolutional neural network and the personalized ranking model.

Similarly, the term "end-to-end learning" refers to mapping outputs of a network or model to the inputs. In many embodiments, end-to-end learning is task-guided to extract visual features from images. As a further tool, the fashion recommendation system employs back propagation, which provides the output of a network or model back to the inputs along with the measured loss and the mapping. In this manner, due to multiple layers and shared weights, networks and models can optimally tune parameters and weights to minimize loss or maximize another factor (e.g., feature vector correlations) until the networks and models converge.

As used herein, the term "latent user features" refers to a vector of numeric values representing preferences, characteristics, and attributes of a user. In particular, the term "latent user features" includes a set of values corresponding to latent and/or hidden preferences of a user. In one or more embodiments, latent user features are represented by a feature vector in multi-dimensional vector space (e.g., three-dimensional space).

Similarly, the term "latent item features" refers to a vector of numeric values representing visual characteristics and attributes of an item. In particular, the term "latent item features" includes a set of values corresponding to latent and/or hidden characteristics identified based on observed user action (e.g., implicit or explicit feedback). In one or more embodiments, latent item features are represented by a feature vector in multi-dimensional vector space.

As used herein, the term "preference predictor" refers to a model that correlates feature vectors between multiple networks and models. In particular, the preference predictor correlates feature vectors between the Siamese convolutional neural network (e.g., latent item features) and the personalized ranking model (latent user features). For example, the fashion recommendation system trains the preference predictor to maximize correlations between the latent item features and the latent user features. In addition, the fashion recommendation system can employ the preference predictor to determine preference prediction scores (e.g., correlation scores) for each item in a dataset when providing personalized fashion recommendations to a user, as detailed below.

Referring now to the figures, the figures describe the fashion recommendation system with respect to articles of clothing and other accessories. One will appreciate that the techniques, operations, methods, and actions described with respect to the fashion recommendation system and the figures apply to other types of image-based recommendation systems. For instance, the actions techniques, operations, methods, and actions described herein can also relate to pairing visual latent item-based properties with latent user preferences for various image-based recommendation systems.

Turning now to the Figures, FIG. 1 shows a diagram of a general process 100 for training a visually-aware personalized preference ranking network in accordance with one or more embodiments. For instance, in one or more embodiments, a fashion recommendation system implements the process 100 to train a visually-aware personalized preference ranking network. The fashion recommendation system can be located in one or more computing devices, such as one or more server devices, one or more client devices, or a combination of server devices and client devices.

As shown in FIG. 1, the fashion recommendation system generates 102 a Siamese convolutional neural network. As mentioned above and further detailed below, the Siamese convolutional neural network is a pair of convolutional neural networks that share tunable weights, parameters, and a loss model. In addition, the Siamese convolutional neural network determines desired latent item features based on comparing positive items to negative items.

To illustrate, in various embodiments, the fashion recommendation system inputs a positive item (e.g., the image of a positive image) into the first network of the Siamese convolutional neural network and a negative item (e.g., the image of a negative item) into the second network. Each of the networks determines visual latent item features based on the input images and outputs latent feature vectors. The Siamese convolutional neural network then compares the positive latent item features with the negative latent item features to distinguish the visual latent properties of items that a user prefers. Additional detail regarding the Siamese convolutional neural network is provided with respect to FIG. 2 below.

As mentioned, the fashion recommendation system provides a positive item and a negative item to the Siamese convolutional neural network. The fashion recommendation system, in some embodiments, obtains the positive and negative items from implicit feedback associated with the user. In particular, the fashion recommendation system can designate items in a dataset associated with user feedback as positive items. In addition, the fashion recommendation system can designate the other items as negative items. Then, using the designations, the fashion recommendation system can generate triplets that include the user, a positive item, and a negative item, which the fashion recommendation system feeds into the Siamese convolutional neural network during training. In this manner, the fashion recommendation system trains the convolutional neural network to recognize latent features of positive items over negative items as well as distinguish latent visual features that are preferred by the user.

In addition to training the convolutional neural network, the fashion recommendation system can also train a personalized ranking model. In particular, as shown in FIG. 1, the fashion recommendation system can generate 104 a personalized ranking model. In one or more embodiments, the personalized ranking model is not a neural network, but is a machine-learning model that learns latent user features. In particular embodiments, the personalized ranking model learns latent user features from the implicit feedback described above.

To illustrate, in various embodiments, the fashion recommendation system uses some or all of the triplets generated for the user to train the personalized ranking model. For instance, the fashion recommendation system employs a Bayesian personalization ranking algorithm with matrix factorization to determine latent user features for a given user based on the triplets generated for the user. In particular, the fashion recommendation system uses the triplets to train the personalized ranking model to prioritize latent features from positive items or latent features from negative items for the user. Additional detail regarding the personalized ranking model is provided with respect to FIG. 2 below.

Upon generating and initially training the Siamese convolutional neural network and the personalized ranking model, the fashion recommendation system can further train the Siamese convolutional neural network and the personalized ranking model. As shown in FIG. 1, the fashion recommendation system can jointly train 106 the Siamese convolutional neural network and the personalized ranking model by correlating the latent item features and the latent user features. In addition, the fashion recommendation system employs a preference predictor to improve correlation and jointly train the network and model.

To illustrate, in many embodiments, the fashion recommendation system forms a visually-aware personalized preference ranking network that includes both the Siamese convolutional neural network and the personalized ranking model. In addition, the visually-aware personalized preference ranking network includes a preference predictor that correlates the output from the Siamese convolutional neural network (e.g., latent item features) with the output from the personalized ranking model (e.g., latent user features). During training, the preference predictor correlates the outputted latent features (i.e., feature vectors) and provides the correlated features to the network and model via back propagation. Because the correlated features are also associated with end-to-end learning by the fashion recommendation system, the Siamese convolutional neural network can tune the shared weights and parameters of the internal networks to better represent latent item features and the personalized ranking model can tune parameters to better learn latent item features, and together produce more accurate latent features for the user. Thus, in one or more embodiments, the fashion recommendation system optimizes pairwise implicit preferences (e.g., whether an item as purchased or not), based on latent properties of the items and their product images, to build a visually-aware personalized recommender system for each user.

Upon being trained, the fashion recommendation system can employ portions of the Siamese convolutional neural network along with the trained latent user features to rank items from a dataset that best reflect a user's preferences. As described in greater detail with respect to FIG. 3, the fashion recommendation system employs the trained preference predictor to determine preference predictions scores for items in a dataset that accurately predict a user's preference of the items, rank the items based on the preference predictions scores, and provide one or more of the items to the user based on the ranked preference predictions scores.

Figure 2:
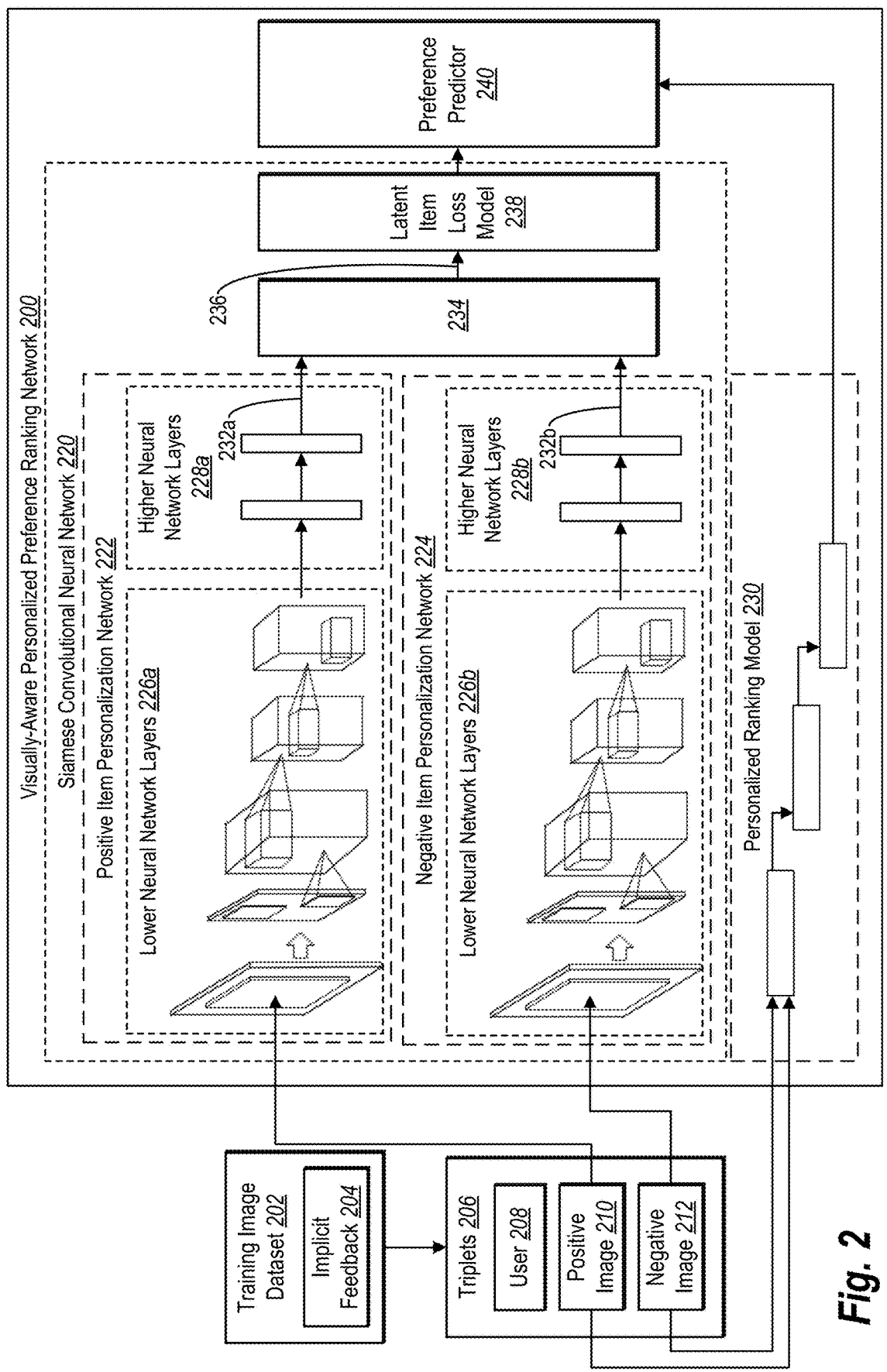
FIG. 2 illustrates a diagram of a more detailed process for training the visually-aware personalized preference ranking network using triplets and implicit user feedback in accordance with one or more embodiments.

As mentioned above, FIG. 2 illustrates a diagram of a more detailed process for jointly training the visually-aware personalized preference ranking network. In particular, FIG. 2 shows training a visually-aware personalized preference ranking network 200 using triplets 206 from a training image dataset 202 that includes implicit feedback 204. As shown, the visually-aware personalized preference ranking network 200 includes a Siamese convolutional neural network 220, a personalized ranking model 230 and a preference predictor 240. Each component is discussed in greater detail below.

As mentioned, the visually-aware personalized preference ranking network 200 includes the Siamese convolutional neural network 220. As shown in the illustrated embodiment, the Siamese convolutional neural network 220 includes a positive item personalization network 222 and a negative item personalization network 224. Both the positive item personalization network 222 and the negative item personalization network 224 include similar lower neural network layers 226a-b and higher neural network layers 228a-b, as shown. As also shown, the positive item personalization network 222 and the negative item personalization network 224 both have outputs that are compared in step 234 (i.e., the system compares the respective outputted latent item features). In other words, the final layer of each network 222, 224 is treated as an item representation that is used in a preference prediction framework. Further, during training, the Siamese convolutional neural network 220 employs a latent item loss model 238.

In many embodiments, the positive item personalization network 222 and the negative item personalization network 224 are convolutional neural networks. The lower neural network layers 226a-b are convolutional layers and can include one or more normalizing and/or pooling layers. The higher neural network layers 228a-b are fully-connected layers that include latent item classifiers.

As mentioned above, the weights and parameters are shared between corresponding layers of the positive item personalization network 222 and the negative item personalization network 224. For example, the weights and parameters in the third convolutional layer of the positive item personalization network 222 match the weights and parameters in the third convolutional layer of the negative item personalization network 224 before, during, and after training the Siamese convolutional neural network 220.

As shown in FIG. 2, the fashion recommendation system obtains a training image dataset 202 that includes implicit feedback 204 for one or more users, and in some additional cases, explicit user feedback. For instance, the training image dataset 202 is a collection of fashion items where each item is represented by at least one image. In various embodiments, each item includes additional data (e.g., descriptions, attributes, classifications, geographic information, temporal dynamics, and/or metadata) that further characterize the item.

As mentioned previously, the training image dataset 202 includes data (e.g., implicit feedback 204) corresponding to user interactions with each item. For instance, for at least one user, the training image dataset 202 indicates if the user has interacted with the item. In additional embodiments, the training image dataset 202 indicates the type of interactions, such as whether the user interaction was implicit or explicit. Examples of implicit user interactions can include viewing, clicking, hovering, selecting, saving, adding to a digital cart, or purchasing an item. In general, implicit actions include actions performed by a user that are not expressly intended to be shared with other users or the public at large or explicitly indicate a preference or lack thereof for an item. In contrast, examples of explicit actions include leaving a review of or comments about an item or sharing the item that indicate an explicit preference or lack thereof for an item. In at least one embodiment, the implicit feedback is the purchase of the item.

In some embodiments, the training image dataset 202 also includes a timestamp of the user interaction. In these embodiments, the fashion recommendation system can use the timestamp to filter out user interactions based on recent, new, or trending fashion items. For instance, the fashion recommendation system includes user interactions with items that have a timestamp within the last two weeks, three months, or year. In this manner, as described further below, the fashion recommendation system can account for changes in user preferences, tastes, and fashion trends and styles that often occur over time.

As shown, the fashion recommendation system employs the training image dataset 202 to generate triplets 206. As mentioned above, a triplet includes a user 208, a positive item, and a negative item. More particularly, a triplet includes a user 208, a positive image 210 of a positive item, and a negative image 212 of a negative item. Within each triplet, the fashion recommendation system ranks positive items over negative items because an assumption in training is that observed implicit feedback is interpreted as "more preferable" to non-observed feedback.

In one or more embodiments, a positive item corresponds to an item in the training image dataset 202 with which the user has interacted. In many embodiments, the fashion recommendation system limits user interactions to implicit feedback 204 when determining positive items for a user. In alternative embodiments, the fashion recommendation system includes all types of user interactions (e.g., both implicit and explicit feedback). Additionally, a negative item corresponds to an item in the training image dataset 202 with which no interaction data is available for a user (e.g., an item has no implicit and/or explicit feedback associated with a user).

To illustrate, the fashion recommendation system generates triplets 206 for a user 208 by identifying a positive item for the user from the training image dataset 202 and by including the positive image 210 of the positive item in the triplet. Additionally, the fashion recommendation system identifies a negative item in the training image dataset 202 and includes the negative image 212 of the negative item in the triplet. Further, in many embodiments, the fashion recommendation system labels the positive image 210 as positive and the negative image 212 as negative within the triplet.

As shown, the fashion recommendation system feeds the triplets 206 into the Siamese convolutional neural network 220. In particular, the fashion recommendation system feeds the positive image 210 to the positive item personalization network 222 and the negative image 212 to the negative item personalization network 224. Each of the item personalization networks determine latent item features for the respective images. Because the item personalization networks employ the same layers along with corresponding weights and parameters, the latent item features produced by the networks are directly comparable to each other. For instance, the outputted feature vectors share the same number of dimensions and visual latent characteristics.

To illustrate, FIG. 2 shows the outputs of the positive item personalization network 222 (i.e., the positive latent item feature 232a) and the negative item personalization network 224 (i.e., the negative latent item feature 232b) feeding into the cost model 234. The cost model 234 generates the distance, in vector space, between the positive latent item feature 232a and the negative latent item feature 232b. Generally, the cost model 234 compares the latent item features between the positive image and a negative item in a triplet. This comparison or discrimination between images is used to teach the Siamese convolutional neural network 220 visual item preferences of the user.

As shown, the cost model 234 outputs a latent item feature 236 that includes the comparison between the positive image 210 (the positive latent item feature 232a) and the negative image 212 (the negative latent item feature 232b) in a triplet. During training, the fashion recommendation system feeds the latent item feature 236 to the latent item loss model 238, which determines an amount of loss for the item personalization networks. For instance, in one or more embodiments, the latent item loss model 238 combines the latent item feature 236 with the positive image label to determine a positive scaler loss for the positive item personalization network 222. The fashion recommendation system can similarly determine a negative scaler loss for the negative item personalization network 224.

In addition, in one or more embodiments, the fashion recommendation system uses back propagation to train the item personalization networks within the Siamese convolutional neural network 220. For instance, using the positive scaler loss, the negative scaler loss, the cost (e.g., latent item feature 236), and the outputted latent item features (e.g., the positive latent item feature 232a and the negative latent item feature 232b), the fashion recommendation system updates the item personalization networks using stochastic gradient via back-propagation. Further, by employing task-guided visual extraction end-to-end learning where the fashion recommendation system maps the input images to the outputs, the fashion recommendation system can more optimally and efficiently train the shared weights and parameters of the Siamese convolutional neural network 220 (e.g., until the error loss is minimized).

As shown, as part of training, the fashion recommendation system can feed the output of the Siamese convolutional neural network 220 to the preference predictor 240. The fashion recommendation system can initially train the Siamese convolutional neural network 220 for a number of iterations before providing latent item features (e.g., latent item feature 236) to the preference predictor 240. In alternative embodiments, the fashion recommendation system provides latent item features to the preference predictor 240 upon performing initial iterations of the Siamese convolutional neural network 220.

Before describing the preference predictor 240, additional detail is now provided regarding the personalized ranking model 230 of the visually-aware personalized preference ranking network 200. As mentioned above, the personalized ranking model 230 is a machine-learning model that determines latent user features for a user. The personalized ranking model 230 can include any number of modules, components, and/or layers to predict latent user features from visual user data (e.g., implicit user data associated item images). One goal of the personalized ranking model is to generate personalized ranking items for a user with which the user has not yet interacted.

In many embodiments, the personalized ranking model 230 employs Bayesian personalized ranking, which is an optimization framework that works well with implicit feedback. For instance, the Bayesian personalized ranking can utilize triplets (e.g., the triplets 206) to determine preference prediction scores (e.g., correlation scores) for items for a user. In particular, by employing Bayesian personalized ranking, the personalized ranking model 230 can determine one or more different user preferences between items in a triplet.

To illustrate, as shown in FIG. 2, the fashion recommendation system feeds the triplets 206 for the user 208 to the personalized ranking model 230. The personalized ranking model 230 applies a Bayesian personalized ranking loss algorithm to the positive image 210 and negative image 212 in the triplet to optimize the ranking of visual user preferences based on the relative comparison of the positive image 210 having a larger preference score for the user than the negative image 212. The personalized ranking model 230 outputs latent user features that represent the visual user preferences. In additional embodiments, the personalized ranking model 230 also employs matrix factorization as an underlying predictor to determine latent user features.

In one or more embodiments, the fashion recommendation system trains the personalized ranking model 230 using back propagation to improve and optimize the ranking of the personalized ranking model 230. Upon the fashion recommendation system initially training the personalized ranking model 230 for one or more iterations, the personalized ranking model 230 provides the latent user features to the preference predictor 240.

As mentioned above, both the Siamese convolutional neural network 220 and the personalized ranking model 230 provide latent features to the preference predictor 240. In general, the preference predictor 240 correlates the two sets of latent features to determine an improved personalized recommendation ranking of items for the user. Indeed, the preference predictor 240 correlates latent user features associated with the user with latent user features to accurately predict compatibility between unseen items and the user. In one or more embodiments, the preference predictor 240 determines a preference prediction score for each item for a user.

In various embodiments, the fashion recommendation system employs the preference predictor 240 to jointly train the Siamese convolutional neural network 220 and the personalized ranking model 230 such that the correlations between the respective latent features maximize at the preference predictor 240. This results in more accurate preference prediction scores (e.g., correlation scores), and further results in improved personalized item rankings for a user.

During training, the preference predictor 240 provides feedback in the form of back propagation to both the Siamese convolutional neural network 220 and the personalized ranking model 230. For example, in one or more embodiments, the preference predictor 240 determines a loss amount, based on triplet information, from correlating the latent item features and the latent user features (e.g., using least squares loss or another loss function). In a similar manner as described above, the fashion recommendation system employs end-to-end learning and joint back propagation to teach both the Siamese convolutional neural network 220 and the personalized ranking model 230 to extract task-guided latent visual features for fashion images particular to a user's fashion preferences.

The fashion recommendation system can continue to jointly train until the visually-aware personalized preference ranking network converges (e.g., the amount of error loss is minimized, and/or latent feature correlation is maximized). Alternatively, the fashion recommendation system can jointly train until either the Siamese convolutional neural network 220 or the personalized ranking model 230 converges.

As a note, in many embodiments, the fashion recommendation system trains a separate visually-aware personalized preference ranking network for users separately. Indeed, in these embodiments, the trained visually-aware personalized preference ranking network is unique to the user and not a collective group of users. Thus, the fashion recommendation system can provide a personalized ranking of items to a user optimized specifically for that user. Further, based on the type or recency of implicit data used from the training image dataset, the fashion recommendation system can further tailor the trained visually-aware personalized preference ranking network to a user's most recent set of fashion preferences as the user's preferences or fashion trends change over time.

As mentioned above, the fashion recommendation system can employ the trained visually-aware personalized preference ranking network to explain variances in a user's fashion preferences for items with which the user has not yet interacted. This is particularly valuable in the area of fashion where new designs are being continually introduced and/or for fashion items that are part of a limited collection. To illustrate, FIG. 3 shows a diagram of employing a trained visually-aware personalized preference ranking network 201 to determine a personalized fashion recommendation to a user in accordance with one or more embodiments.

Figure 3:
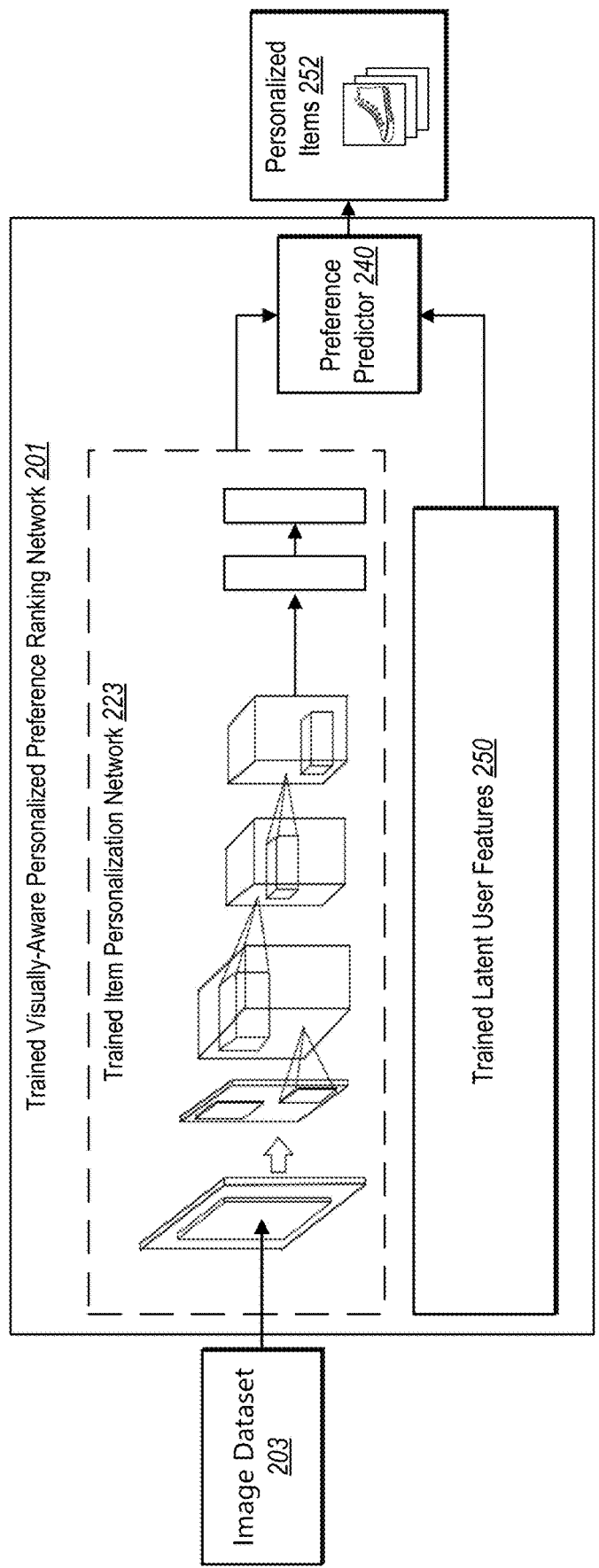
FIG. 3 illustrates a diagram of employing a trained visually-aware personalized preference ranking network to determine a personalized fashion recommendation for a user in accordance with one or more embodiments.

As shown in FIG. 3, the trained visually-aware personalized preference ranking network 201 includes a trained item personalization network 223, trained latent user features 250, and a preference predictor 240. In one or more embodiments, the trained item personalization network 223 employs the shared weights and parameters from the Siamese convolutional neural network 220. In other words, once trained, the Siamese convolutional neural network 220 need only employ one of the two convolutional neural networks (e.g., the positive item personalization network 222 or the negative item personalization network 224), since both networks have the same weights and parameters that were optimized through the joint training described above.

Similarly, once the personalized ranking model 230 has learned an optimal set of latent item features for the user, the fashion recommendation system can employ the set of trained latent user features 250 in determining personalized item rankings for the user. In addition, the fashion recommendation system can update and re-train either the Siamese convolutional neural network 220 and/or personalized ranking model 230 (e.g., periodically or upon request) to learn updated representations for the user.

As mentioned, the trained visually-aware personalized preference ranking network 201 also includes the preference predictor 240. Similar to the explanation given previously, the preference predictor 240 correlates latent item features from the trained item personalization network 223 with the trained latent user features 250 to determine user-specific preference prediction scores for items, which are then used to rank the items.

To illustrate, the fashion recommendation system obtains an image dataset 203. In one or more embodiments, the image dataset 203 includes items that overlap with the training image dataset 202 described above. For example, both datasets include items from a merchant's shopping digital catalog. In alternative embodiments, the image dataset 203 includes items not included in the training image dataset 202. In this manner, the fashion recommendation system can train a visually-aware personalized preference ranking network with items from the training image dataset 202 and apply the trained visually-aware personalized preference ranking network 201 to various image datasets, possibly across domains. For instance, the training image dataset 202 corresponds to shirts while the image datasets correspond to pants and fashion accessories.

Generally, the image dataset 203 includes items with which the user as not interacted. Thus, while a larger item image database includes both items that have observed and non-observed user interaction, the image dataset 203 may include only the non-observed items (e.g., items with which the user has not interacted). In alternative or additional embodiments, the image dataset 203 includes items with which the user has not interacted with for over a threshold period of time (e.g., six weeks, three months, or a year), or with which the user has only briefly interacted. In this manner, the fashion recommendation system can recommend fashion item to a user that they have not yet seen or experienced. In alternative embodiments, the image dataset 203 includes both sets of observed and non-observed fashion items.

Upon obtaining the image dataset 203, the fashion recommendation system provides images of the items to the trained item personalization network 223. Using the learned weights and parameters described above, the trained item personalization network 223 determines latent item features for each of the images, which are provided to the preference predictor 240. As described above, in some embodiments, the trained item personalization network 223 generates a multidimensional latent item feature vector for each item's image.

Additionally, the preference predictor 240 correlates the latent item features for each item image in the image dataset 203 to the trained latent user features 250 to determine preference prediction scores for each item. As described above, the fashion recommendation system can use the preference prediction scores to rank each item's compatibility with the user's fashion preferences. Additional detail regarding determining the preference prediction scores is provided below with respect to FIG. 4.

Using the preference prediction scores, the fashion recommendation system can identify one or more items that are preferred by the user. For instance, the fashion recommendation system selects the three (or another number) of items having the highest preference prediction scores. The fashion recommendation system then provides the identified items to the user, which is shown in FIG. 3 as personalized items 252.

In some embodiments, the fashion recommendation system provides the personalized items 252 to a user in response to user interaction. For example, the fashion recommendation system detects or receives user input from the user selecting a fashion category from a merchant's website. In response, the fashion recommendation system can select items in the category to include in the image dataset 203 and provide the user with personalized items 252 included in that category (even if the visually-aware personalized preference ranking network is trained across all categories of fashion items). Similarly, if a user is interacting with an item, the fashion recommendation system identifies related items to include in the image dataset 203.

Figure 4:
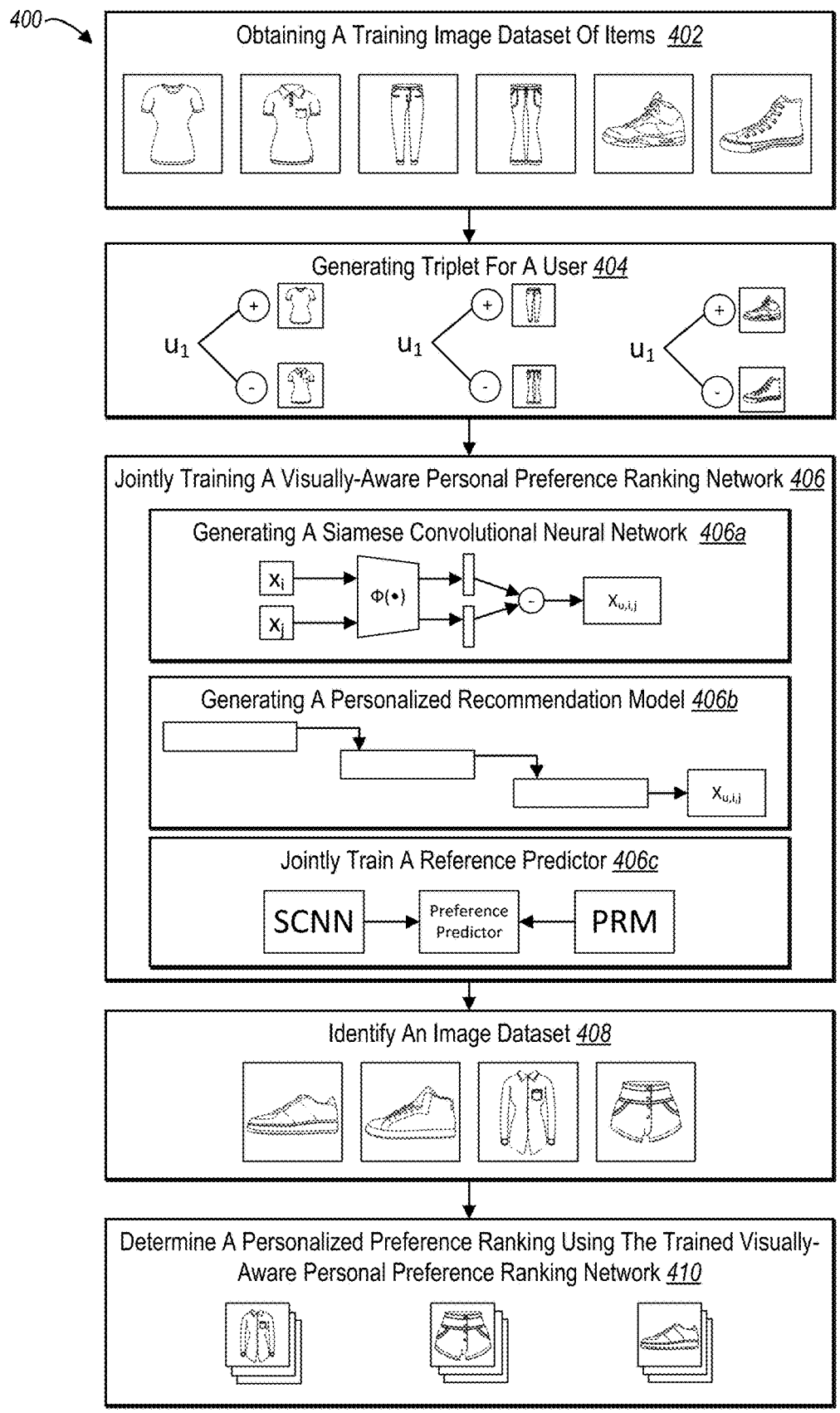
FIG. 4 illustrates acts in performing a step for jointly training, based on triplets, a preference predictor using a Siamese convolutional neural network and personalized ranking model as well as acts in performing a step for determining item preferences for the user from an unobserved set of items using the preference predictor in accordance with one or more embodiments.

Moving to the next figure, FIG. 4 illustrates acts 400 in performing a step for jointly training, based on triplets, a preference predictor using a Siamese convolutional neural network and personalized ranking model as well as acts in performing a step for determining item preferences for the user from an unobserved set of items using the preference predictor in accordance with one or more embodiments. In various embodiments, the fashion recommendation system described herein performs the series of acts 400. In some embodiments, the fashion recommendation system is located on a server device and performs one or more of the series of acts 400 in connection with a client device.

As shown, the series of acts 400 includes an act 402 of obtaining a training image dataset of items. In various embodiments, the images (e.g., 224×224 or another size) correspond to fashion items, some of which the user has interacted with and provide implicit feedback. For example, the training image dataset corresponds to fashion items provided by an online merchant and some of the fashion items have implicit user feedback associated with them based on the user's online interactions with the items. In alternative embodiments, the images correspond to a different domain of items with which the user interacts and provides feedback.

In one or more embodiments, the fashion recommendation system uses U to denote a set of users and I to denote items in a dataset. Further, for implicit feedback associated with items in the dataset, the fashion recommendation system uses $I_u^+$ to denote a set that includes all items about which user u has expressed positive feedback (e.g., implicit feedback). Further, each item i within the items I (i.e., i∈I) is associated with an image, denoted $X_i$. These notations are used below.

As FIG. 4 also illustrates, the series of acts 400 includes an act 404 of generating triplets for a user. In one or more embodiments, the fashion recommendation system generates a set of triplets for the user that includes the user (e.g., a user identifier, a positive image, and a negative image). As explained earlier, the positive image corresponds to fashion items in the training image dataset with which implicit feedback has been observed between the user and the item. Similarly, the negative image corresponds to fashion items in the training image dataset having no feedback associated with the user. In generating triplets, the fashion recommendation system prioritizes the positive image over the negative image, as described above. Notably, the negative images in a triplet do not indicate negative feedback by a user, but rather non-observed feedback or a lack of user feedback for an item.

In one or more embodiments, the fashion recommendation system generates triplets according to sub-domain (e.g., a fashion category). For example, with respect to the domain of fashion items, the fashion recommendation system generates separate sets of triplets for the user for the sub-domain of shoes, tops, pants, accessories, etc. In this manner, the fashion recommendation system can train a visually-aware personalized preference ranking network to learn variances in a user's fashion preferences for each fashion item category. In alternative embodiments, as described above, the fashion recommendation system generates triplets without regard to fashion categories.

Further, in some embodiments, the fashion recommendation system filters which items to include in a triplet based on recency to focus on the user's recent observed interactions and/or trending fashion items. For example, the fashion recommendation system identifies feedback from the last few months or season to use to train the visually-aware personalized preference ranking network. In this manner, the fashion recommendation system can determine a user's current fashion preferences among the ever-changing trends and styles that occur in the area of fashion.

In addition, the fashion recommendation system can generate any number of triplets for a user. For example, the fashion recommendation system can pair the same positive image with multiple negative images, and vice versa, to generate a large number of triplets for a user. Alternatively, the fashion recommendation system can generate a triplet for some or all of the positive items associated with a user in the training image dataset. In some embodiments, the fashion recommendation system generates at least a minimum number of triplets for each user (e.g., 100, 1000, 10,000) to ensure adequate training of the visually-aware personalized preference ranking network.

As shown in FIG. 4, the series of acts 400 includes an act 406 of jointly training a visually-aware personalized preference ranking network. In particular, the act 406 includes jointly training, based on triplets, a preference predictor using a Siamese convolutional neural network and personalized ranking model. As shown, the act 406 includes multiple parts. For example, the act 406 includes generating 406a a Siamese convolutional neural network, generating 406b a personalized ranking model, and jointly training 406c a preference predictor.

To illustrate, in one or more embodiments, the fashion recommendation system generates 406a a Siamese convolutional neural network (denoted as (DO) to extract visual features directly from images themselves by creating two matching convolutional neural networks. For example, the fashion recommendation system creates two convolutional neural networks using a convolutional neural network-fast (CNN-F) architecture. In alternative embodiments, the fashion recommendation system employs a more powerful convolutional neural network architecture that can include additional learnable layers.

In embodiments where the CNN-F architecture mentioned above is employed, the fashion recommendation system can create eight learnable layers, five of which are convolutional and three of which are fully-connected layers. Further, in additional embodiments, the fashion recommendation system can set the probability of dropout to 0.5 as well as set the weight decay term to $10^{-3}$. Note, the fashion recommendation system can also set the dimension of the last layer to K, as opposed to other CNN-F models that set the dimension of the last layer to 1,000. In this manner, each of the convolutional neural networks in the Siamese convolutional neural network learns a representation (i.e., latent item features) whose dimensions explain the variance in users' fashion preferences.

In addition, the fashion recommendation system generates 406b a personalized ranking model. As mentioned previously, the personalized ranking model often employs Bayesian personalized ranking (BPR), which is an optimization framework that works well with implicit feedback. For instance, the fashion recommendation system employs Bayesian personalized ranking to optimize rankings for a user by considering triplets (u, i, j) or (user, positive item image, negative item image), where:

$$D=\{(u,i,j)|u \in U \wedge i \in I_u^+ \wedge j \in I \setminus I_u^+\}. \quad (1)$$

As shown in Equation 1, D represents an item dataset (e.g., training image dataset). In addition, $i \in I_u^+$ represents an item for which the user u has expressed interest (e.g., observed implicit feedback), whereas $j \in I \setminus I_u^+$ represents an item for which the user u has not expressed interest (e.g., non-observed implicit feedback). As mentioned above, within the triplet, the fashion recommendation system should assign a larger preference score to item i than item j.

Moreover, based on Equation 1, the Bayesian personalized ranking defines the difference between preference scores as:

$$x_{u,i,j}=x_{u,i}-x_{u,j}. \quad (2)$$

In Equation 2, $x_{u,i}$ represents the preference of the user u for positive item i and $x_{i,j}$ represents the non-preference of the user u for negative item j. In this manner, the personalized ranking model can optimize the ranked samples for the user based on the triplets generated for user u.

Further, as shown, the fashion recommendation system jointly trains 406c a preference predictor. In particular, the fashion recommendation system jointly trains the Siamese convolutional neural network and the personalized ranking model using a preference predictor through back propagation and end-to-end learning such that the trained visually-aware personalized preference ranking network can extract task-guided visual features for fashion images on a per user basis.

As mentioned above, in one or more embodiments, the fashion recommendation system also employs matrix factorization. In some embodiments, matrix factorization is employed within the personalized ranking model, as described above. In alternative embodiments, matrix factorization can carry over to the preference predictor. To illustrate, in one or more embodiments, the fashion recommendation system employs matrix factorization to jointly train the preference predictor in connection with the Siamese convolutional neural network and the personalized ranking model.

To improve upon issues that occur with pre-trained features, which are generally optimized for image classification and not determining fashion preferences let alone user fashion preferences, in one or more embodiments, the fashion recommendation system employs an end-to-end framework. For instance, in one or more embodiments, the fashion recommendation system replaces the pre-trained visual features and embedding matric with the Siamese convolutional neural network generated above (e.g., $\Phi(\bullet)$, which extracts visual features directly from the images themselves and products more accurate features. Thus, in these embodiments, the preference predictor becomes:

$$x_{u,i}=\alpha+\beta_u+\theta_u^T \Phi(X_i). \quad (3)$$

In Equation 3, $\alpha$ represents an offset, $\beta_u$ represents user biases, and $\theta_u^T$ represents visual user-item preferences. As mentioned above, the fashion recommendation system uses the preference predictor to jointly train the visually-aware personalized preference ranking network. For example, in one or more embodiments, the fashion recommendation system jointly trains the Siamese convolutional neural network and personalized ranking model, as well as the preference predictor by optimizing the objective function shown in Equation 4 below.

$$\max \sum_{(u,i,j)} \ln \sigma(x_{u,i,j}) - \lambda_\Theta \|\Theta\|^2 \qquad (4)$$

In Equation 4, $\sigma(\bullet)$ represents the sigmoid function known in the art. In addition, $\Theta$ includes all model parameters from the Siamese convolutional neural network and the personalized ranking model. Further, $\lambda_\Theta$ represents a regularization hyper-parameter. In various embodiments, since all parts of the objective are differentiable, the fashion recommendation system performs optimization by stochastic gradient ascent using a stochastic optimization method with adaptive estimation of moments (e.g., an Adam optimizer, as known in the art). Further, during each iteration of stochastic gradient ascent, the fashion recommendation system samples a user u, a positive item $i \in I_u^+$, and a negative item $j \in I \setminus I_u^+$. In this manner, the Siamese convolutional neural network (i.e., $\Phi(\bullet)$) considers two images (i.e., $X_i$ and $X_j$). Again, as described above, each of the convolutional neural networks in the Siamese convolutional neural network (i.e., $\Phi(X_i)$ and $\Phi(X_j)$ learn and share the same weights and parameters.

Moreover, during training of the visually-aware personalized preference ranking network, the fashion recommendation system can approximately optimize the AUC (i.e., Area Under the Receiver Operating Characteristic curve) in terms of ranking observed feedback for each user, and in particular, when considering a large number of samples of non-observed items.

During or after training, the fashion recommendation system can refine the preference predictor to determine preference scores. For example, Equation 5 shows a simplified preference predictor.

$$x_{u,i} = \theta_u^T \Phi(X_i) \qquad (5)$$

Equation 5 is based on Equation 3 above. However, the global bias term $\alpha$ and the user bias term $\beta_u$ are discarded, as they cancel between $x_{u,i}$ and $x_{u,j}$ based on Equation 2, shown above. As shown in Equation 5, the simplified preference predictor correlates the trained Siamese convolutional neural network (e.g., latent item features) and the trained latent user features by applying the latent user features to the latent item features determined for each item image.

As shown in FIG. 4, the series of acts 400 also includes an act 408 of identifying an image dataset. The image dataset includes multiple fashion items with which the user has not yet interacted. In some embodiments, one or more items in the image dataset overlap with items in the training image dataset described above. In other embodiments, the items in the image dataset are distinct from the training image dataset. In addition, the image dataset can be divided into categories, such as various fashion categories.

Additionally, as shown in FIG. 4 the series of acts 400 includes an act 410 of determining a personalized preference ranking using the visually-aware personalized preference ranking network. In one or more embodiments, the act 410 includes determining item preferences for the user from an unobserved set of items using the preference predictor.

To illustrate, in one or more embodiments, the fashion recommendation system applies the trained preference shown in Equation 5 to determine preference prediction scores for each item i in the image dataset for the user u. In particular, the fashion recommendation system feeds each image (e.g., $X_i$) for an item from the image dataset into the trained convolutional neural network (e.g., $\Phi(\bullet)$), as described above, which results in determining latent item features for each image. In addition, the fashion recommendation system correlates the latent item features for each image to the trained latent user features (e.g., $\theta_u$) to determine a preference prediction score for each item (e.g., $x_{u,j}$).

Figure 8:
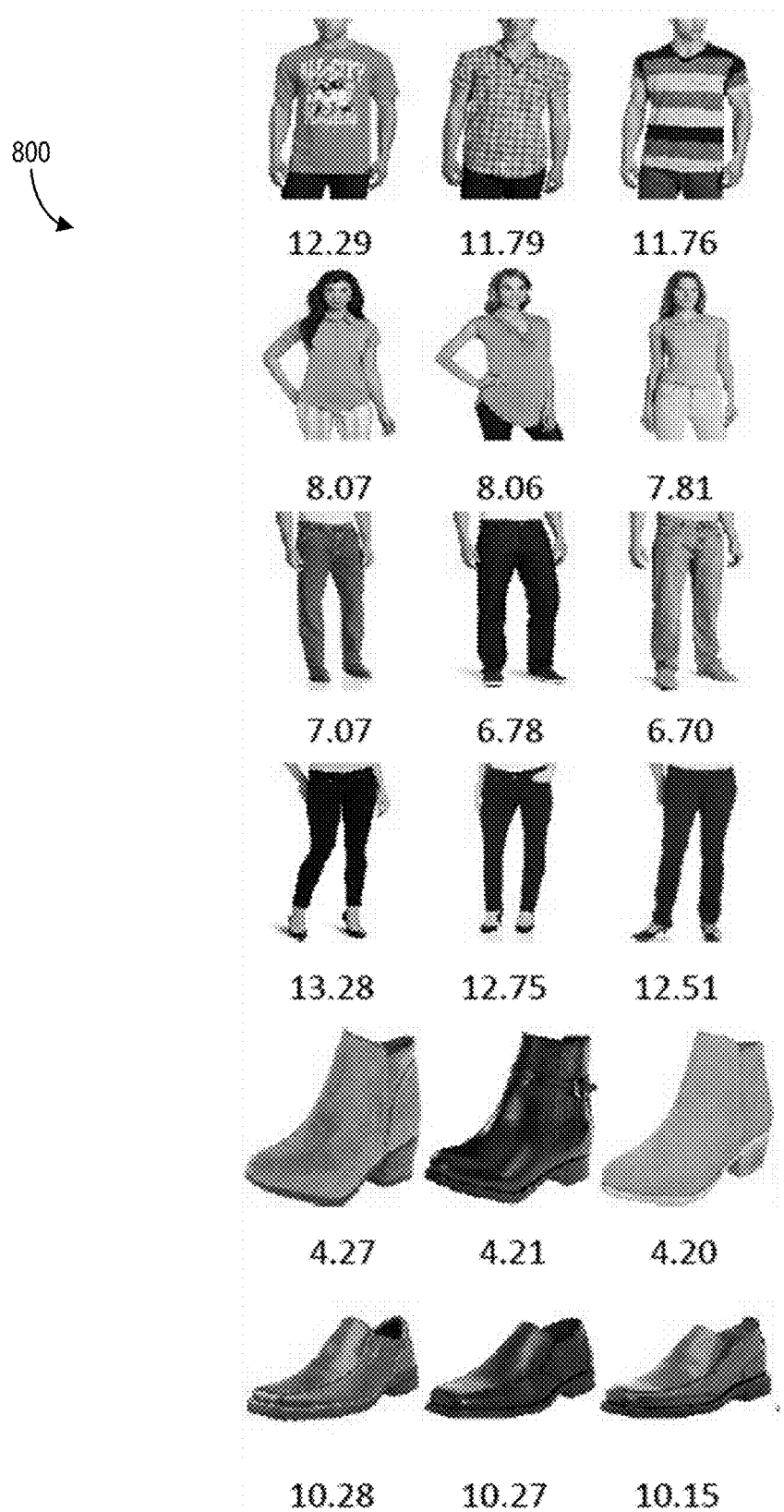
FIG. 8 illustrates visual results of the fashion recommendation system in providing users with personalized fashion recommendations in accordance with one or more embodiments.

Upon determining preference prediction scores for each item in the image dataset, the fashion recommendation system can rank items according to the probability that the user will prefer an item with which the user has yet to interact. In some embodiments, the fashion recommendation system ranks the items based on each item's preference prediction score. An example of item preference prediction scores is shown in FIG. 8, discussed below.

In additional embodiments, the fashion recommendation system sorts items by category or sub-domain before or after ranking each of the items. For example, given a user u and a category c, in one or more embodiments, the fashion recommendation system can retrieve existing items in the dataset to maximize a user's preference score, as shown in Equation 6 below, where $X_c$ represents the set of item images belonging to category c.

$$\delta(u, c) = \underset{e \in X_c}{\mathrm{argmax}}\ x_{u,e} = \underset{e \in X_c}{\mathrm{argmax}}\ \theta_u^T \Phi(e) \qquad (6)$$

Additionally, the fashion recommendation system can provide one or more of the ranked items to a user. For example, the fashion recommendation system selects a threshold number of top items to present to a user via a client device associated with the user. In another example, the fashion recommendation system provides ranked items to a user that are above a threshold preference prediction score. As described above, the fashion recommendation system can provide one or more ranked items (e.g., personalized items) to the user upon the user's request or in response to a user's interaction with related items.

Figure 5:
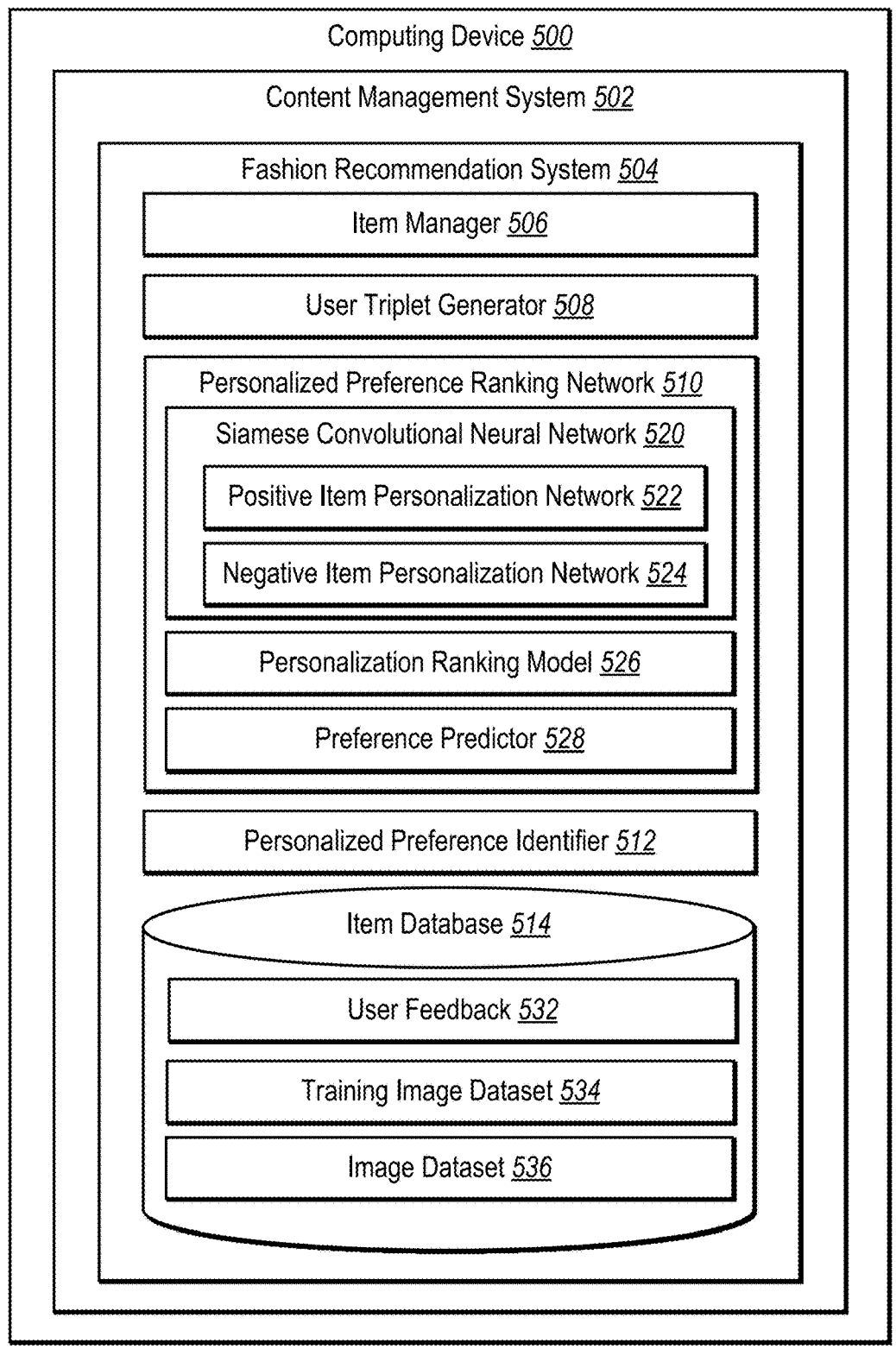
FIG. 5 illustrates a schematic diagram of a fashion recommendation system in accordance with one or more embodiments.

Referring now to FIG. 5, additional detail will be provided regarding capabilities and components of the fashion recommendation system in accordance with one or more embodiments. In particular, FIG. 5 shows a schematic diagram of an example architecture of the fashion recommendation system 504 located within a content management system 502 and hosted on a computing device 500. The fashion recommendation system 504 can represent one or more embodiments of the fashion recommendation system described previously.

As shown, the fashion recommendation system 504 is located on a computing device 500 within a content management system 502. In general, the computing device 500 may represent various types of computing devices. For example, in some embodiments, the computing device 500 is a non-mobile device, such as a desktop or server, or client device. In other embodiments, the computing device 500 is a mobile device, such as a mobile telephone, a smartphone, a PDA, a tablet, a laptop, etc. Additional details with regard to the computing device 500 are discussed below as well as with respect to FIG. 11.

The content management system 502, in general, facilitates the creation, modification, sharing, accessing, storing, and/or deletion of digital content (e.g., items). For example, the content management system 502 stores a repository of fashion items on the computing device 500, such as in the item database 514. Additionally, or alternatively, the content management system 502 can access content located remotely, such as fashion items located on a third-party database. Further, in some embodiments, the content management system 502 can be located separately from the computing device 500 and provide content to the computing device 500.

In addition, the content management system 502 can operate in connection with one or more applications to display ranked items on the computing device 500. For example, in one or more embodiments, the content management system 502 provides one or more ranked items personalized to a user to within an online browsing application or another application. In some embodiments, the content management system 502 is part of an application that is access able via a user client device.

As illustrated in FIG. 5, the fashion recommendation system 504 includes various components. For example, the fashion recommendation system 504 includes an item manager 506, a user triplet generator 508, a personalized preference ranking network 510, a personalized preference identifier 512, and an item database 514 that includes user feedback 532, a training image dataset 534, and an image dataset 536. Each of these components is described below in turn.

As shown, the fashion recommendation system 504 includes the item manager 506. In one or more embodiments, the item manager 506 can store, access, catalog, classify, filter, create, remove, and/or organize items (e.g., fashion items). In some embodiments, the item manager 506 stores the training image dataset 534 and/or the image dataset 536 within the item database 514 on the computing device 500. In one or more embodiments, the item manager 506 also stores images, such as fashion images of items, on the computing device 500. For instance, the item manager 506 associates and stores images of items with corresponding items.

As shown, the fashion recommendation system 504 includes the user triplet generator 508. The user triplet generator 508 can generate triplets from the training image dataset 534 used to train the visually-aware personalized preference ranking network 510. For example, the user triplet generator 508 generates triplets that include a user, a positive item image, and a negative item image, as previously described. In this manner, the user triplet generator 508 can generate a triplet that includes a positive item based on implicit user feedback and a negative item based on non-observed user feedback, where the positive item is ranked above the negative item. Additional description regarding generating triplets is provided above in connection with FIG. 2 and FIG. 4.

In addition, the fashion recommendation system 504 includes the personalized preference ranking network 510. In one or more embodiments, the personalized preference ranking network 510 is a visually-aware personalized preference ranking network. As shown, the personalized preference ranking network 510 includes a Siamese convolutional neural network 520 having a positive item personalization network 522 and a negative item personalization network 524. In addition, the personalized preference ranking network 510 includes a personalized ranking model 526 and a preference predictor 528. Components of the personalized preference ranking network 510 are detailed above.

As explained earlier, the fashion recommendation system 504 can train the personalized preference ranking network 510 in a joint end-to-end manner using back propagation to directly extract task-guided visual features (e.g., latent item features) as well as determine latent user features based on the triplets generated from the training image dataset 534. In this manner, the fashion recommendation system 504 trains the personalized preference ranking network 510 to make accurate predictions and rankings with respect to a user's fashion preferences, even as those preferences change over time.

As shown, the fashion recommendation system 504 includes the personalized preference identifier 512. As described above, in one or more embodiments, the fashion recommendation system 504 employs a trained convolutional neural network from the convolutional neural network, trained latent user features, and the trained preference predictor 528 to determine preference prediction scores for each item in the image dataset 536 personalized to a user. In addition, the personalized preference identifier 512 can sort, arrange, organize, rank, and/or present one or more personalized items to a user, such as via a user client device.

As shown, the fashion recommendation system 504 includes the item database 514. The item database 514 includes the user feedback 532, the training image dataset 534, and the image dataset 536 mentioned above. In one or more embodiments, the user feedback 532 includes feedback (e.g., implicit or explicit) observed from the user with respect to one or more items in the item database 514. Further, as mentioned above, the training image dataset 534 and the image dataset 536 can include items (i.e., images of items) used to train and rank of items to provide to a user.

Each of the components 506-536 of the fashion recommendation system 504 can include software, hardware, or both. For example, the components 506-536 can include one or more instructions stored on a computer-readable storage medium and executable by processors of one or more computing devices, such as a client device or server device. When executed by the one or more processors, the computer-executable instructions of the fashion recommendation system 504 can cause the computing device(s) to perform the feature learning methods described herein. Alternatively, the components 506-536 can include hardware, such as a special-purpose processing device to perform a certain function or group of functions. Alternatively, the components 506-536 of the fashion recommendation system 504 can include a combination of computer-executable instructions and hardware.

Furthermore, the components 506-536 of the fashion recommendation system 504 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 506-536 may be implemented as a stand-alone application, such as a desktop or mobile application. Furthermore, the components 506-536 may be implemented as one or more web-based applications hosted on a remote server. The components 506-536 may also be implemented in a suite of mobile device applications or "apps." To illustrate, the components 506-536 may be implemented in an application, including but not limited to ADOBE® CREATIVE CLOUD® software. "ADOBE" and "CREATIVE CLOUD" are either registered trademarks or trademarks of Adobe Systems Incorporated in the United States and/or other countries.

Figure 6:
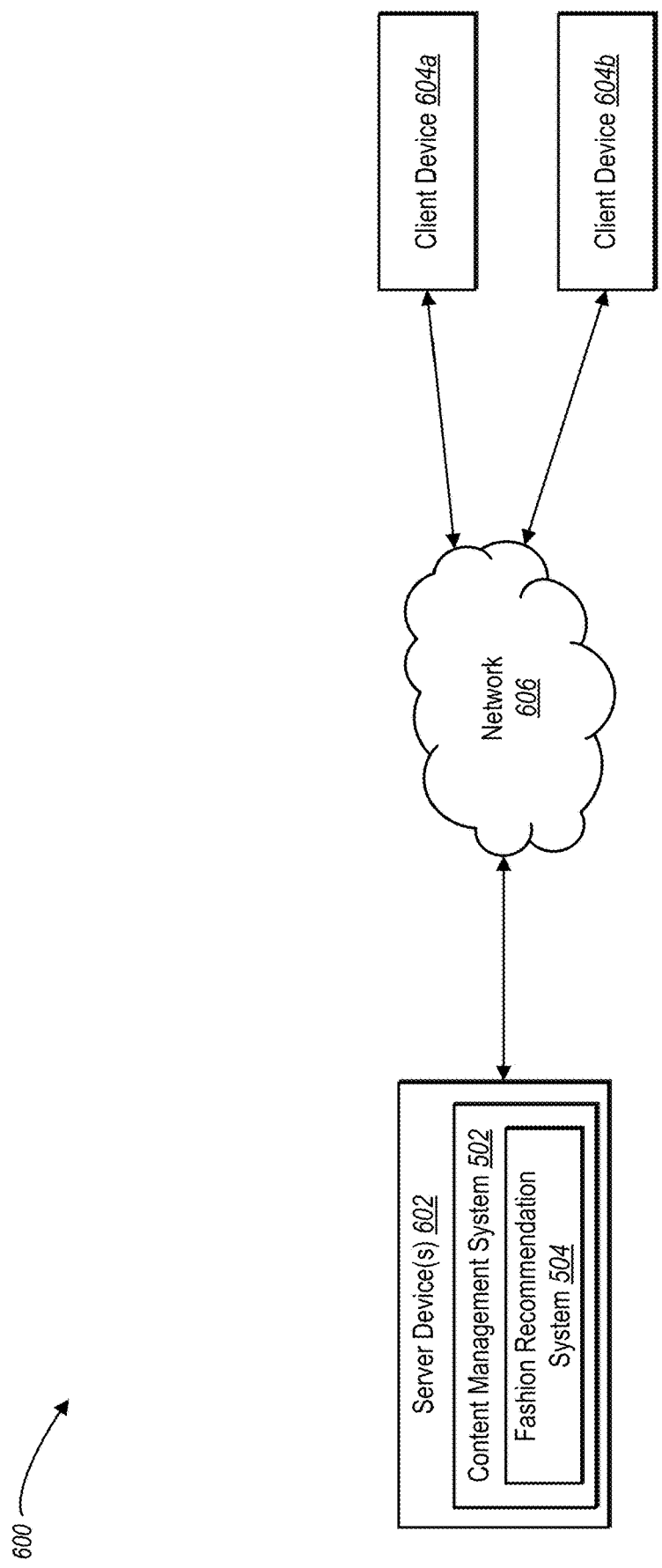
FIG. 6 illustrates a schematic diagram of an example environment in which the fashion recommendation system may be implemented in accordance with one or more embodiments.

FIG. 6 illustrates a schematic diagram of an environment 600 in which the fashion recommendation system 504 may be implemented in accordance with one or more embodiments. In one or more embodiments, the environment 600 includes various computing devices including server device(s) 602 and one or more client devices 604a, 604b. In addition, the environment 600 includes a network 606. The network 606 may be any suitable network over which the computing devices can communicate. Example networks are discussed in more detail below with regard to FIG. 11.

As illustrated in FIG. 6, the environment 600 includes the server device(s) 602, which may comprise any computing device, such as one or more of the computing devices described below in relation to FIG. 11. In addition, the server device(s) 602 includes the content management system 502 and the fashion recommendation system 504, which are described previously. For example, as described above, the fashion recommendation system 504 can train and apply a visually-aware personalized preference ranking network to accurately recommend personalized fashion items to a user with which the user has not yet interacted.

In addition, the environment 600 includes the one or more client devices 604a, 604b. The client devices 604a, 604b may comprise any computing device, such as the computing device described below in relation to FIG. 11. As described above, the one or more client devices 604a, 604b can employ the trained visually-aware personalized preference ranking network to identify and accurately recommend personalized fashion items to a user.

As illustrated, in one or more embodiments, the server device(s) 602 can include all, or a portion of, the fashion recommendation system 504. In particular, the fashion recommendation system 504 can comprise an application running on the server device(s) 602 or a portion of a software application that can be downloaded from the server device(s) 602. For example, the fashion recommendation system 504 can include a web hosting application that allows a client device 604a to interact with content hosted on the server device(s) 602. To illustrate, in one or more embodiments of the environment 600, the client device 604a accesses a web page supported by the server device(s) 602. In particular, the client device 604a can run an application to allow a user to access, view, select, and/or identify fashion items within a web page or website hosted at the server device(s) 602, as explained previously.

Although FIG. 6 illustrates a particular arrangement of the server device(s) 602, the client devices 604a, 604b and the network 606, various additional arrangements are possible. For example, while FIG. 6 illustrates the one or more client devices 604a, 604b communicating with the server device(s) 602 via the network 606, in one or more embodiments a single client device may communicate directly with the server device(s) 602, bypassing the network 606.

Similarly, although the environment 600 of FIG. 6 is depicted as having various components, the environment 600 may have additional or alternative components. For example, the fashion recommendation system 504 can be implemented on multiple computing devices. In particular, the fashion recommendation system 504 may be implemented in whole by the server device(s) 602 or the fashion recommendation system 504 may be implemented in whole by the client device 604a. Alternatively, the fashion recommendation system 504 may be implemented across multiple devices or components (e.g., utilizing the server device(s) 602 and the one or more client devices 604a, 604b).

Turning now to FIG. 7 and FIG. 8, additional detail is provided with respect to evaluating the embodiments of the fashion recommendation system. As mentioned above, the fashion recommendation system outperforms conventional systems in head-to-head evaluations with respect to fashion recommendations for a user. Indeed, the fashion recommendation system improves current methods to predict and provide ranked personalized fashion recommendations. Additional results of testing and evaluating the fashion recommendation system are described below with respect to FIG. 7.

To illustrate, FIG. 7 illustrates a results table 710 comparing conventional fashion recommendation systems to one or more embodiments of the fashion recommendation system disclosed herein. As an overview of the experiment, researchers perform both quantitative and qualitative experiments to evaluate ranking performance. By way of context, the researchers conducted the experiments on a commodity workstation with a 4-core Intel CPU and a single GTX-1080 graphics card. Notably, although the training dataset employed contains hundreds of thousands of images and nearly a million user-item interactions, training the disclosed systems took researchers about one day on the commodity hardware.

For the training datasets, a first group of datasets included reviews of clothing items crawled from an online merchant. The researchers first extracted a first dataset called Fashion, which contains six representative fashion categories (e.g., men/women's tops, bottoms, and shoes). The researchers also included two additional comprehensive datasets, containing all subcategories (e.g., gloves, scarves, sunglasses, etc.), named Women and Men. For each of these three training datasets, the researchers treated the users' reviews as implicit feedback for the purposes of testing and comparison.

In addition, the researchers crawled implicit data from a second online commerce merchant, referred to in FIG. 7 as "com," which is a customer-to-customer online platform for buying and selling used fashion items. This dataset included several kinds of implicit feedback include clicks, purchases, sales, etc. For all four datasets, each item had an associated image and a pre-extracted CNN feature representation used to test the conventional systems (as described above, the fashion recommendation system uses the Siamese convolutional neural network to directly extract visual latent item features rather than use pre-extracted CNN feature representations).

Further, with respect to generating triplets, the researchers discarded inactive users u for whom $|I_u^+|<5$. Then, for each user, the researchers randomly withheld one action for validation $V_u$, and another action for testing $T_u$. The remaining items were used for training $P_u$. Notably, when reporting the results shown in the results table 710 in FIG. 7, the researchers reported the best performance for each model based on the validation set.

With respect to evaluation metrics, the researchers calculated the AUC to measure recommendation performance of the disclosed systems of the fashion recommendation system and that of the baselines (i.e., conventional systems). The AUC measures the quality of a ranking based on pairwise comparisons. Further, AUC is the measure that BPR-like methods (e.g., the baselines) are trained to optimize. Formally, the evaluation metric is mathematically shown in Equation 7 below.

$$AUC = \frac{1}{|U|} \sum_{u \in U} \frac{1}{|D_u|} \sum_{(i,j) \in D_u} \xi(x_{u,i} > x_{u,j}) \quad (7)$$

In Equation 7, $D_u$ equals $\{(i,j)|(u,i) \in T_u \wedge (u,j) \notin (P_u \cup V_u \cup T_u)\}$ and $\xi(\cdot)$ represents an indicator function. In this manner, the researchers counted the fraction of times that the observed items i are preferred over the non-observed items j.

In addition, when generating images, the researchers used three metrics to evaluate preference scores, image quality, and diversity. For a given user u, a large preference score $x_{u,i}$ suggests that the user u would be interested in item i. Hence, the compared systems, including the disclosed systems (i.e., $\delta(u, c)$ in Equation 8 attempt to determine items with an objective value as large as possible.

For the evaluations, the researchers randomly sampled a user u and a category c to the category of the item in the test set $T_u$, and computed the mean objective value (i.e., Equation 6) of compared methods. For image quality, the researchers found the inception score, which is a commonly used heuristic approach to measure image quality, based on a standard pre-trained inception network, where higher scores typically mean better quality. For diversity, the researchers calculated the visual similarity of pairs of returned images for each query (i.e., a user and a category), and then averaged the multiple queries. The researchers measured the visual similarity by structural similarity (SSIM), which they found to be more consistent with human visual perception than the mean squared error and other traditional measures. Regarding SSIM, similarity scores range from 0 to 1, where higher values indicate more similar images. The researchers then determined Opposite Mean SSIM, which is one minus mean SSIM, to represent diversity. There, a higher value means better diversity.

When evaluating methods in terms of their AUC, the researchers compared the disclosed systems of the fashion recommendation system against the following baselines, which correspond to the baselines shown in the results table 710 in FIG. 7. a) Random (RAND) images, which ranks images in a random order. By definition, this method has an AUC of 0.5. b) PopRank images, which ranks images in order of their popularity. c) WARP Matrix factorization, which ranks images using weighted approximated ranking pairwise (WARP) loss. d) BPR-MF, which ranks images using standard matrix factorization. e) VisRank, which ranks images based on visual similarity using the pre-trained CNN features. f) Factorization Machines (FM), which ranks images based on generic factorization approach. g) VBPR, which ranks images using visually-aware personalized ranking from implicit feedback using of pre-trained CNN features of product images. Notably, the disclosed systems of the fashion recommendation system are shown as g) DVBPR in the results table 710 or deep visually-aware Bayesian personalized ranking.

The researchers performed evaluations with respect to two settings, All Items and Cold Items. For the cold items, the researchers sought to estimate relative preference prediction scores among items that have few observations at training time (e.g., fewer than 5).

Upon performing the evaluations, the researchers found that, on average, the disclosed systems (i.e., DVBPR) outperformed the second-best method by 5.13% across all datasets, and 2.73% in cold-start scenarios. The disclosed systems outperformed the strongest content-unaware method (i.e., BPR-MF) substantially, as well as outperformed the 'nearest-neighbor' style baseline (i.e., VisRank).

Regarding qualitative results, FIG. 8 illustrates visual results 800 of the fashion recommendation system in providing users with personalized fashion recommendations in accordance with one or more embodiments. As shown in the results, the fashion recommendation system identifies the top three image results from an image dataset that have been personalized for a particular user. Notably, each row represents a different user and a different product category.

As shown in the results, each image includes a value. The values indicate the preference prediction score for each image, where a higher preference prediction score indicates a better match to the given user. For example, the researchers used the preference predictor of the trained visually-aware personalized preference ranking network to determine the preference prediction score, as explained earlier.

FIGS. 1-8, the corresponding text, and the examples provide a number of different methods, systems, devices, and non-transitory computer-readable media of the fashion recommendation system. In addition to the foregoing, one or more embodiments can also be described in terms of flowcharts comprising acts for accomplishing a particular result. For example, FIG. 9 and FIG. 10 may be performed with more or fewer acts. Further, the acts may be performed in differing orders. Additionally, the acts described herein may be repeated or performed in parallel with one another or parallel with different instances of the same or similar acts.

Figure 9:
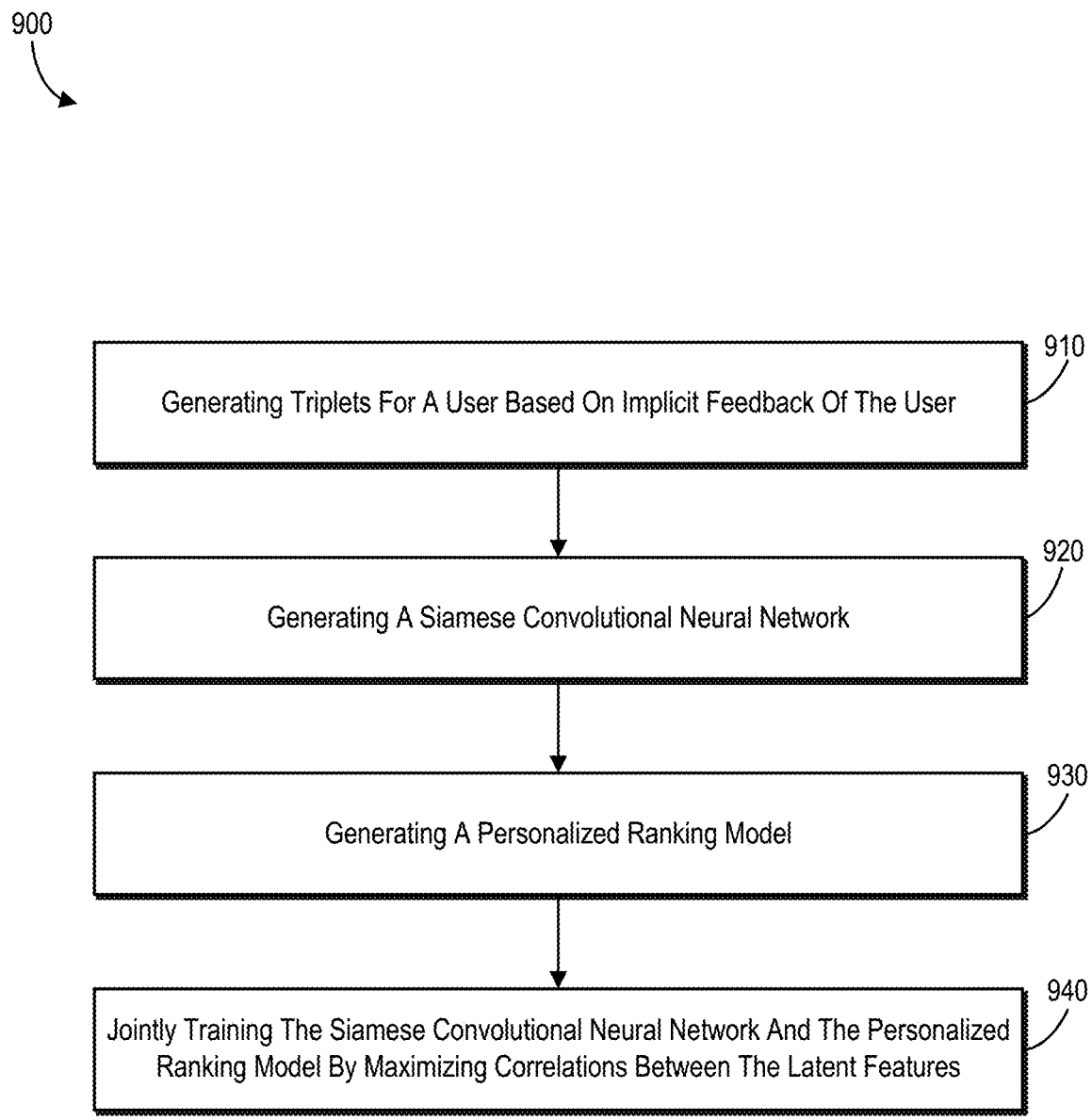
FIG. 9 illustrates a flowchart of a series of acts for jointly training a visually-aware personalized preference ranking network to provide personalized fashion recommendations in accordance with one or more embodiments.

As mentioned, FIG. 9 illustrates a flowchart of a series of acts 900 for jointly training a neural network and personalized ranking model to determine latent fashion preference predictions and provide personalized fashion recommendations in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

In one or more embodiments, the series of acts 900 is implemented on one or more computing devices, such as the computing device 500 or the server device(s) 602. In addition, in some embodiments, the series of acts 900 is implemented in a digital environment for recommending fashion items to a user. For example, the series of acts 900 is implemented on a computing device having memory that stores an image training dataset of items comprising implicit feedback from a user for a subset of the items. In additional embodiments, the computing device also stores a Siamese convolutional neural network including a positive convolutional neural network and a negative convolutional neural network and a personalized ranking model. In various embodiments, the images correspond to fashion items.

The series of acts 900 includes an act 910 of generating triplets for a user based on implicit feedback of the user. In particular, the act 910 can involve generating triplets where each of the triplets includes the user, a positive item image from the subset of the items based on the implicit feedback from the user, and a negative item image from the image training dataset of items. In some embodiments, the act 910 includes obtaining positive items from the image training dataset that are associated with user observed implicit user feedback as well as negative items from the image training set with which the user has not interacted.

The series of acts 900 includes an act 920 of generating a Siamese convolutional neural network. In one or more embodiments, the Siamese convolutional neural network includes a positive convolutional neural network and a matching negative convolutional neural network, where the two networks share the same number of convolutional layers, fully-connected layers, tunable weights and parameters. In addition, the Siamese convolutional neural network includes a single cost function that compares the feature vectors output from the positive and negative networks as well as a loss function used during training.

In various embodiments, the act 920 includes initially training the Siamese convolutional neural network based on the generated triplets. For example, the act 920 includes feeding the positive item image into a first convolutional neural network of the Siamese convolutional neural network and the negative item image into a second convolutional neural network of the Siamese convolutional neural network. Additionally, in some embodiments, the act 920 includes training the Siamese convolutional neural network by determining visual user-item feature preferences based on comparing a positive item feature output from the first convolutional neural network to a negative item feature output from the second convolutional neural network (e.g., using the cost function). In this manner, the act 920 can include determining the visual user-item feature preferences by subtracting, in feature vector space, the negative item feature from the positive item feature.

As shown, the series of acts also includes an act 930 of generating a personalized ranking model. The act 930 can include training the personalized ranking model by employing Bayesian personalized ranking low algorithm. In one or more embodiments, the personalized ranking model also employs matrix factorization and/or stochastic gradient in connection with the Bayesian personalized ranking to determine the latent user features. In various embodiments, the act 930 includes training the personalized ranking model based on the generated triplets.

As shown, the series of acts 900 also includes an act 940 of jointly training the Siamese convolutional neural network and the personalized ranking model by maximizing correlations between the latent features. In particular, the act 940 can involve jointly training, using the triplets, the Siamese convolutional neural network to determine latent item features that are favored by the user and a personalized ranking model to determine latent user features, where the joint training includes maximizing correlations between the latent item features and the latent user features. In some embodiments, the act 940 includes jointly training the Siamese convolutional neural network and the personalized ranking model using task-guided end-to-end training and back propagation for improved visual extraction of latent features.

The series of acts 900 can also include a number of additional acts. In one or more embodiments, the series of acts 900 includes the acts of determining a user preference predictor based on the jointly trained Siamese convolutional neural network and personalized ranking model. In additional embodiments, the preference predictor employs matrix factorization and/or stochastic gradient ascent to correlate feature vectors from the Siamese convolutional neural network and the personalized ranking model. In additional embodiments, the series of acts 900 includes the acts of determining preference predictor scores for the user by correlating the visual user-item feature preferences to the latent user features.

In one or more embodiments, the negative item image is excluded from the subset of the items. Further, items in the subset of the items of the image training dataset of items are ranked higher than items excluded from the subset of items, and particularly in triplets. In some embodiments, the implicit feedback from the user includes observable interactions of the user with the subset of the items. For example, the implicit feedback includes clicks, views, and purchases of items in the dataset of items. In many embodiments, the items correspond to articles of clothing or fashion accessories.

Figure 10:
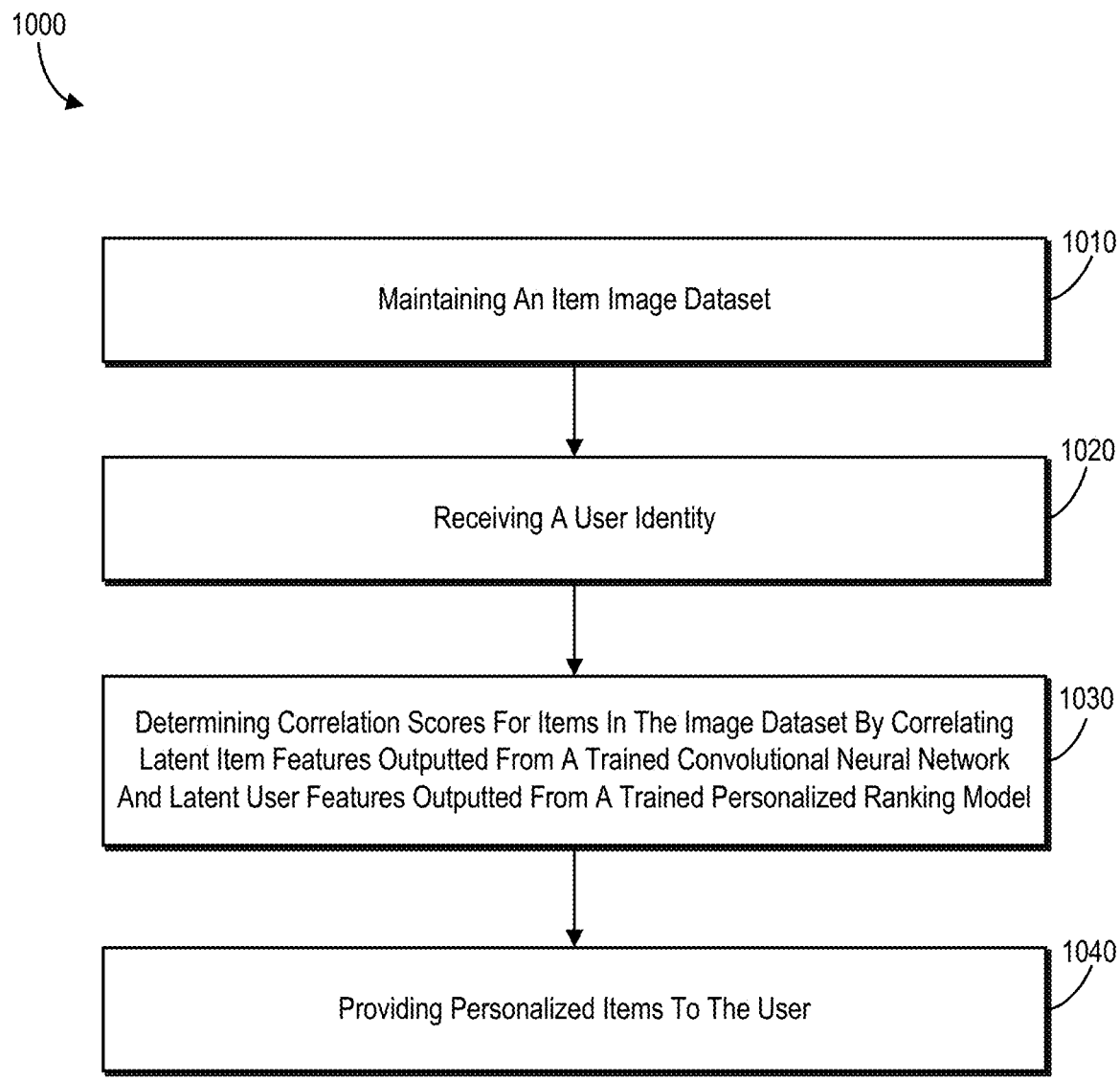
FIG. 10 illustrates a flowchart of a series of acts for providing personalized fashion recommendations using a trained visually-aware personalized preference ranking network in accordance with one or more embodiments.

As mentioned previously, FIG. 10 illustrates a flowchart of a series of acts 1000 for providing personalized fashion recommendations using a trained visually-aware personalized preference ranking network in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In one or more embodiments, a system can perform the acts of FIG. 10. In some embodiments, the series of acts 1000 is implemented by a computing system on one or more computing devices, such as the computing device 500 or the server device(s) 602.

As shown, the series of acts 1000 includes an act 1010 of maintaining an item image dataset. In particular, the act 1010 can involve maintaining an item dataset including images of each of the items. In one or more embodiments, the image dataset includes unobserved items with which the user has not yet interacted. In some embodiments, the image dataset corresponds to a subcategory of articles of clothing or fashion accessories In addition, the series of acts 1000 includes an act 1020 of receiving a user identity. In particular, the act 1020 can involve receiving an identity of a user. For example, the act 1020 includes receiving a user identifier that matches the user to a user included in a training image dataset. Additionally, or alternatively, the user identifier matches the user to a trained visually-aware personalized preference ranking network specifically trained for the user.

The series of acts 1000 also includes an act 1030 of determining correlation scores for items in the image dataset by correlating latent item features outputted from a trained convolutional neural network and latent user features outputted from a trained personalized ranking model. In particular, the act 1030 can involve determining preference prediction scores between the user and items of the dataset using a convolutional neural network trained to determine latent item features for the user and using latent user features outputted from a trained personalized ranking model, where the trained convolutional neural network is trained as part of a Siamese convolutional neural network, and where the Siamese convolutional neural network is jointly trained end-to-end with a personalized ranking model using implicit feedback observed from the user. In one or more embodiments, the act 930 also includes identifying the latent user features outputted from the trained personalized ranking model based on the user identifier.

In addition, the series of acts 1000 includes an act 1040 of providing personalized items to the user. In particular, the act 1040 can involve providing, based on the preference prediction scores, one or more items from the dataset to a client device associated with the user. In some embodiments, the act 1040 can include providing the one or more items from the dataset to the user after ranking the one or more items based on the preference prediction scores.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the fashion recommendation system to jointly train and employ a visually-aware personalized preference ranking network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
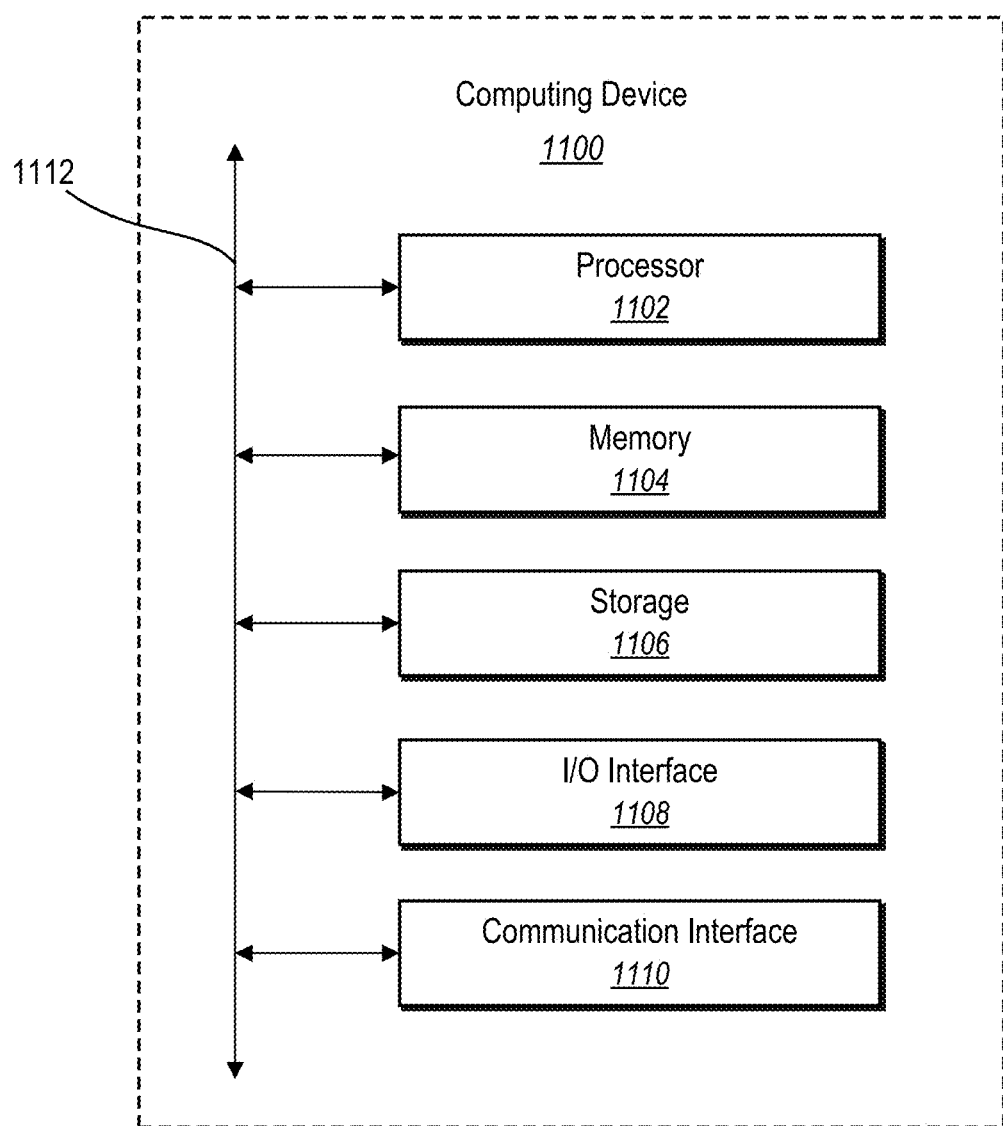
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 500, server device(s) 602, and client devices 604a-b). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 or ("I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for jointly training a neural network and a preference ranking model to determine latent preference predictions for a user comprising:
   a memory component comprising:
      an image training dataset of items comprising implicit feedback from a user for a subset of the items, wherein the implicit feedback includes clicks, views, and purchases of items in the image training dataset of items;
      a Siamese convolutional neural network comprising a positive convolutional neural network and a negative convolutional neural network; and
      a personalized ranking model;
   one or more processing devices coupled to the memory component, the one or more processing devices to perform operations comprising:
      generating triplets where each of the triplets comprises the user, a positive item image from the subset of the items based on the implicit feedback from the user, and a negative item image from the image training dataset of items; and
      jointly training, using the triplets, the Siamese convolutional neural network to determine latent item features that are favored by the user and the personalized ranking model to determine latent user features by:
         processing the positive item image with the positive convolutional neural network;
         processing the negative item image with the negative convolutional neural network; and
         processing the positive item image and the negative item image with the personalized ranking model.

2. The system of claim 1, wherein jointly training the Siamese convolutional neural network and the personalized ranking model comprises using task-guided end-to-end training and back propagation.

3. The system of claim 1, wherein the operations further comprise determining a user preference predictor based on the jointly trained Siamese convolutional neural network and personalized ranking model.

4. The system of claim 1, wherein jointly training the Siamese convolutional neural network comprises using the triplets for the user by feeding the positive item image into a first convolutional neural network of the Siamese convolutional neural network and the negative item image into a second convolutional neural network of the Siamese convolutional neural network, wherein the first convolutional neural network and the second convolutional neural network share tunable weights and parameters.

5. The system of claim 4, wherein the operations further comprise training the Siamese convolutional neural network by determining visual user-item feature preferences based on comparing a positive item feature output from the first convolutional neural network to a negative item feature output from the second convolutional neural network.

6. The system of claim 5, wherein the operations further comprise determining the visual user-item feature preferences by subtracting, in feature vector space, the negative item feature output from the positive item feature output.

7. The system of claim 6, wherein the operations further comprise determining a preference predictor for the user by correlating the visual user-item feature preferences to the latent user features.

8. The system of claim 1, wherein the operations further comprise training the personalized ranking model by employing Bayesian personalization ranking loss.

9. The system of claim 8, wherein the Bayesian personalization ranking loss comprises a visually-aware deep Bayesian personalization ranking loss that employs stochastic gradient.

10. The system of claim 1, wherein the negative item image is excluded from the subset of the items, and wherein items in the subset of the items of the image training dataset of items are ranked higher than items excluded from the subset of the items.

11. The system of claim 1, wherein the implicit feedback from the user comprises observable interactions of the user with the subset of the items.

12. The system of claim 1, wherein the items correspond to articles of clothing or fashion accessories.

13. A non-transitory computer-readable medium storing executable instructions which, when executed by at least one processing device, cause to the at least one processing device to perform operations comprising:
maintaining an image training dataset of items comprising implicit feedback from a user for a subset of the items, wherein the implicit feedback includes clicks, views, and purchases of items in the image training dataset of items;
generating triplets where each of the triplets comprises the user, a positive item image from the subset of the items based on the implicit feedback from the user, and a negative item image from the image training dataset of items; and
jointly training, using the triplets, a Siamese convolutional neural network to determine latent item features that are favored by the user and a personalized ranking model to determine latent user features by:
processing the positive item image with a positive convolutional neural network of the Siamese convolutional neural network;
processing the negative item image with a negative convolutional neural network of the Siamese convolutional neural network; and
processing the positive item image and the negative item image with the personalized ranking model.

14. The non-transitory computer-readable medium of claim 13, wherein the operations further comprise:
determining preference prediction scores between the user and items with which the user has not yet interacted; and
providing, based on the preference prediction scores, one or more items of the items with which the user has not yet interacted to a client device associated with the user.

15. The non-transitory computer-readable medium of claim 14, wherein the operations further comprise:
identifying latent user features outputted from the personalized ranking model based on a user identifier of the user; and
generating latent item features for the user identifier, utilizing an item personalization neural network that is a branch of the Siamese convolutional neural network.

16. The non-transitory computer-readable medium of claim 15, wherein the operations further comprise determining the preference prediction scores between the user and the items with which the user has not yet interacted by correlating the latent item features and the latent user features utilizing a preference predictor model.

17. A method comprising:
generating triplets where each of the triplets comprises a user, a positive item image from an image training dataset of items based on implicit feedback from the user, wherein the implicit feedback includes clicks, views, and purchases of items in the image training dataset of items, and a negative item image from the image training dataset of items;
performing a step for jointly training, based on the triplets, a preference predictor using a Siamese convolutional neural network and personalized ranking model by:
processing the positive item image with a positive convolutional neural network;
processing the negative item image with a negative convolutional neural network; and
processing the positive item image and the negative item image with the personalized ranking model; and
performing a step for determining item preferences for the user from an unobserved dataset of items using the preference predictor.

18. The method of claim 17, wherein the positive item image in each triplet is ranked with a higher user preference for the user than the negative item image in the triplet.

19. The method of claim 17, wherein the unobserved dataset of items corresponds to a subcategory of articles of clothing or fashion accessories.

20. The method of claim 17, wherein the step for jointly training further comprises maximizing correlations between latent item features and latent user features.

* * * * *